United States Patent
Suzuki et al.

(10) Patent No.: US 7,720,480 B2
(45) Date of Patent: May 18, 2010

(54) SYSTEM AND METHOD FOR REDUCING A NO-COMMUNICATION PERIOD DURING HAND-OFF

(75) Inventors: Takaaki Suzuki, Ayase (JP); Yi Lou, Yokohama (JP); Hideo Aoe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 11/633,418

(22) Filed: Dec. 5, 2006

(65) Prior Publication Data
US 2007/0270146 A1 Nov. 22, 2007

(30) Foreign Application Priority Data
Dec. 5, 2005 (JP) ............................. 2005-350950

(51) Int. Cl.
H04W 36/00 (2009.01)
H04W 4/00 (2009.01)
(52) U.S. Cl. ...................... 455/436; 455/434
(58) Field of Classification Search ................ 455/434, 455/436
See application file for complete search history.

(56) References Cited

U.S. PATENT DOCUMENTS

| | | | |
|---|---|---|---|
| 2003/0007466 A1* | 1/2003 | Chen ........................... | 370/328 |
| 2003/0007480 A1* | 1/2003 | Kim et al. .................... | 370/349 |
| 2004/0147236 A1* | 7/2004 | Parkvall et al. .............. | 455/132 |
| 2004/0192308 A1* | 9/2004 | Lee et al. ..................... | 455/436 |
| 2006/0147236 A1* | 7/2006 | Uchida et al. ................ | 400/62 |
| 2007/0022396 A1* | 1/2007 | Attar et al. ..................... | 716/5 |
| 2007/0042781 A1* | 2/2007 | Yavuz et al. ................. | 455/445 |

FOREIGN PATENT DOCUMENTS

JP 2004-343552 12/2004

OTHER PUBLICATIONS

3GPP2 C.S0024 cdma2000 High Rate Packet Data Air Interface Specification Version 4.0, Chapter 3.4 and Chapter 8.4, pp. 3-5 and 3-11.
3GPP2 C.S0024-A cdma2000 High Rate Packet Data Air Interface Specification Version, Chapter 11.7.6.1.5 and Chapter 14.2.1.3.3.3., pp. 11-102-11-108.
3GPP2 C.S0024-A v1.0 Subtype 2 Physical Layer, Chapter 14.2.1.3.3, pp. 14-26-14-28.
3GPP2 C.S0024 Version 4.0 MAC Layer, Chapter 8.4, pp. 8-35-8-50.

* cited by examiner

*Primary Examiner*—Lun-Yi Lao
*Assistant Examiner*—Opiribo Georgewill
(74) *Attorney, Agent, or Firm*—Antonelli, Terry, Stout & Kraus, LLP.

(57) ABSTRACT

To improve efficiency of a radio section while reducing a no-communication period in the case of handoff in communication used DRC and DSC signals. A communication connection apparatus (BS) 200 provided in a communication system accumulates data transmitted from the communication control apparatus (BSC) 300. In a state in which a DSC signal from a communication terminal (AT) 100 designates an owed BS, when a DRC indication from the AT 100 is switched from another BS to the owned BS, the BS 200 transmits data received from the BSC 300 last to the AT 100 out of the data accumulated in the BS 200. Consequently, missing data is requested from the BS 200 at a handoff destination in accordance with a retransmission request function existing in the AT 100. Moreover, retransmission processing for data by a retransmission request message is performed in the BS 200.

8 Claims, 27 Drawing Sheets

SYSTEM AND METHOD FOR REDUCING A NO-COMMUNICATION PERIOD DURING HAND-OFF

BACKGROUND OF THE INVENTION

The present invention relates to a communication method and a communication system, and, more particularly to a communication method and a communication system used for a radio communication system that uses Data Rate Control (DRC) and Data Source Control (DSC).

In recent years, in a packet communication system and a mobile communication system, data communication such as transmission and reception of mails using mobile terminals, access to the Internet, and Web browsing has been actively performed. A system for such data communication using mobile terminals includes, for example, a communication terminal apparatus (Access Terminal, hereinafter referred to as AT) serving as a mobile terminal, a communication connection apparatus (Base Station, hereinafter referred to as BS) serving as a fixed station, a communication control apparatus (Base Station Control, hereinafter referred to as BSC) that connects plural communication connection apparatuses, and an external network such as a public network. When the BSC receives data from the external network, the BSC transfers the data to the BS. The BS transfers data to the AT according to radio communication. In order to realize such data communication, for example, it has become a general practice to follow the standardized data transmission procedure described in 3GPP2C.S0024 (Non-patent Document 1).

When the AT moves, the AT is required to switch a communication destination from a certain BS to another BS and continue the data communication. This switching operation is referred to as Handoff. As a basic operation of the Handoff, for example, there are operations such as securing of a radio communication path with a moving destination BS, switching of a data reception source BS, and opening of a radio communication path with a moving source BS.

In the securing and the opening of the radio communication path with the moving destination BS, the AT requests the BS and the BSC to secure and open the radio communication path. In the switching of the data reception source BS, the AT has a function of selecting a BS with a best reception state on the basis of reception intensity of a radio wave and notifying a result of the selection to the BS and the BSC as a Data Rate Control (DRC) signal. The BSC has a function of determining a BS at a transfer destination of data on the basis of a DRC received from the AT. The BS has a function of transmitting the data to the AT only when the BS receives a DRC, which is transferred to the BS, from the AT. The DRC signal includes a DRC Cover value. The DRC Cover value is determined for each BS. The AT notifies the BS of a DRC Cover value of a BS selected as a communication destination by carrying the DRC Cover value on a DRC signal. These methods of selecting a communication destination using the DRC are described in detail in, for example, Chapter 8.4 of C.S0024 (Non-patent Document 1).

When data is lost while the data is transferred from the BSC to the AT, in order to transmit the data again to compensate for the loss, the BSC has a function of accumulating data for retransmission, a function of granting continuous sequence numbers to the respective data at the time of data transmission, and a function of retransmitting the data in response to a retransmission request from the AT. The AT has a function of checking the sequence numbers granted to the data to detect loss of the data and a function of transmitting a message for requesting retransmission of the lost data (a Nak message) to the BSC. These methods of retransmitting data using the Nak message are described in detail in Chapter 3.4 of C.S0024 (Non-patent Document 1).

In a system of the Handoff, from the time when the AT carries out switching of a DRC according to a change in reception radio wave intensity until the time when the BSC changes a BS to be a transmission destination of data, the data arrives at the moving destination BS from the BSC, and the data is transmitted from the BS to the AT, a period in which the data does not flow on the radio communication path appears. When such a period appears, inconvenience occurs in an operation of an application in which it is expected that the data continuously arrive or a fall of throughput occurs. As a method of solving this problem, for example, 3GPP2 C.S0024-A (Non-patent Document 2) is disclosed.

In the Non-patent Document 2, a system for notifying a BS and a BSC of a BS at a Handoff destination from an AT using a DSC (Data Source Control) signal a fixed time before the AT issues an instruction for switching DRC is described. For this purpose, the AT has a function of notifying the BS and the BSC of the DSC switching instruction before switching the DRC. The BSC has a function of not only transmitting data to a BS indicated by a DRC but also transmitting data to a BS indicated by a DSC. Since the BSC receives the notice of the DSC in this way, the BSC can predict DRC switching in advance. By transmitting identical data to plural BSs from the BSC, the data is transmitted to the AT from the BS without spending time at the time of the DRC switching. This makes it possible to eliminate a no-communication period at the time of DRC switching, which is a problem in the Non-patent Document 1. These methods of transmitting data using the DSC are explained in detail in, for example, Chapter 11.7.6.1.5 and Chapter 14.2.1.3.3.3 of C.S0024-A (Non-patent Document 2).

In a method disclosed, when a receiver detects loss of segments, the receiver transmits a minimum sequence number of the lost segments and a confirmation response including a value indicating the number of the lost segments as an advertised window size to a transmitter (see, for example, Patent Document 1).

[Patent Document 1] JP-A-2004-343552
[Non-patent Document 1] 3GPP2 C.S0024 cdma2000 High Rate Packet Data Air Interface Specification Version 4.0, Chapter 3.4 and Chapter 8.4
[Non-patent Document 2] 3GPP2 C.S0024-A cdma2000 High Rate Packet Data Air Interface Specification Version 1.0, Chapter 11.7.6.1.5 and Chapter 14.2.1.3.3.3.

SUMMARY OF THE INVENTION

As described above, as a technique for reducing a no-communication period, the Non-patent Document 2 is disclosed. In this method, a BS for which Handoff is predicted to be performed by the DSC is notified to the BSC in advance and data is transmitted from the BSC to both a BS at a Handoff source and the BS predicted as a Handoff destination to reduce a no-communication period that appears between the AT and the BS.

However, in this method, the BS at the Hand off destination cannot learn to which extent the BS at the Handoff source has sent the data to the AT and to which extent the AT has received the data. There is no clear definition concerning this point in the Non-patent Document 2. Therefore, when the BS at the Handoff destination receives DRC switching from the AT, the BS at the handoff destination transmits data accumulated by the BS itself to the AT regardless of to which extent the AT has received the data from the BS at the Handoff source. The AT cannot receive continuous data unless a sequence number of data that the AT received last from the BS at the Handoff source and a sequence number of data from which the BS at the Handoff destination started transmission to the AT are continuous. When a sequence number (e.g., 50) of data that the AT received last from the BS at the Handoff source is larger than a sequence number (e.g., 30) of data from which the BS at the Handoff destination started transmission to the AT, since identical data (e.g., 30 to 50) passes a radio section, efficiency of use of the radio section falls. On the contrary, when a sequence number (e.g., 70) of data from which the BS at the Handoff destination started transmission to the AT is smaller than a sequence number (e.g. 50) of data that the AT received last from the BS at the Handoff source, data from which data (S51 to 69) is lost arrives at the AT from the BS. In this case, since the AT has to notify a Nak message to the BSC through the BS and retransmit the data to the AT from the BSC through the BS, a delay equivalent to the retransmission occurs.

In view of the points described above, it is an object of the invention to provide a communication method and a communication system that can prevent redundant transmission of data in a radio section and a delay of data arrival due to retransmission while inheriting the effect of reduction in a no-communication period. It is another object of the invention to, as a method with which a BS at a Handoff destination judges a head of data, from which transmission to an AT should be started, out of data accumulated in the BS itself, use a Nak message from the AT and, compared with the conventional system using only DSC, to make it possible to prevent redundant data from being transmitted in a radio section to improve efficiency of use of the radio section. It is still another object of the invention to shift a function of retransmitting data using the Nak message from the BSC to the BS and reduce time until the AT receives retransmission data from the Nak message transmission compared with the conventional system of retransmitting data from the BSC.

It is still another object of the invention to, such that there is no shortage in the data accumulated in the Handoff destination BS at the time of DRC switching, transmit missing data from the BSC to the Handoff destination BS with DSC switching as an opportunity to make it easy to realize the effects of the invention even in a situation in which a switching time is short. It is still another object of the invention to, since the retransmission function by the Nak message is a function already provided in the AT and the invention does not need to add a new function to a large number of ATs compared with the BS and the BSC and spread the ATs, make it possible to quickly expand the invention to the market.

In the retransmission system by the Nak message described in the Non-patent Document 1 and the Non-patent Document 2, a sequence number of lost data is notified from the AT to the BSC to specify data that should be retransmitted. In the invention, a sequence number of data that the AT received last from a BS at a switching source is notified to a switching destination BS using this Nak message. In retransmission processing by the Nak message, in order to eliminate time-consuming data transmission between the BSC and the BS, transmission of retransmission data originally carried out by the BSC is performed by the BS. Moreover, when a DRC signal from the AT has changed an indication from another BS to the own BS, data received last from the BSC among the data accumulated in the BS is transmitted to the AT to induce a Nak message to the AT. Consequently, it is possible to reduce a no-communication period in a radio section and prevent a data delay due to redundant transmission and retransmission of data.

Specifically, the BS provided in the communication system accumulates data transmitted from the BSC in the BS. In a state in which a DSC instruction from the AT designates the own BS, when the DRC instruction from the AT is switched from another BS to the own BS, data received last from the BSC is transmitted to the AT out of the data accumulated in the BS. Moreover, retransmission processing of data by the Nak message performed by the BSC is performed by the BS.

More specifically, the BS includes a data accumulating section that accumulates data transmitted from the BSC in the BS, a Nak message analyzing section that analyzes a Nak message notified from the AT and extracts a sequence number, and a data retransmitting section that retransmits the data from the BS to the AT in accordance with the sequence number extracted by the Nak message analyzing section. The BS also includes a DRC judging section that receives a DRC signal from the AT and judges whether the DRC signal is a DRC instruction to the own BS and a DSC judging section that receives a DSC signal from the AT and judges whether the DSC signal is a DSC instruction to the own BS. Moreover, the BS includes a data transmitting section that judges, on the basis of results of the DRC judging section and the DSC judging section, timing at which the DRC is switched to another BS to the own BS in a state in which the DSC faces the own BS, extracts latest data from the data accumulating section, and transmits the latest data.

Between the AT and the BS, when the AT transmits DRC indicating switching from the BS at the Handoff source to the BS at the Handoff destination and the BS at the Handoff destination receives the DRC, the BS at the Handoff destination transmits latest data among the accumulated data to the AT. The AT transmits a Nak message in order to request the BS to retransmit data lost between data received last from the BS at the Handoff source and the data received from the BS at the Handoff destination. The BS at the Handoff destination, which has received the Nak message, extracts the data missing in the AT from the data accumulating section in accordance with the Nak message and transmits the data to the AT.

A communication terminal apparatus connected to a communication network using radio includes, for example:

a data receiving section that receives data from the communication network;

a data loss processing section that detects loss of the data received by the data receiving section and creates a request for retransmission to the communication network; and a data transmitting section that transmits the request for retransmission created by the data loss processing section to the communication network.

The data loss processing section includes, for example, a sequence number judging section and a NAK message creating section.

A communication terminal apparatus of another form connected to a communication network using radio includes, for example:

a DRC creating section that selects one data reception source from plural communication networks and creates a DRC (Data Rate Control) signal for a data transmission request;

a DSC creating section that creates a DSC (Data Source Control) signal for a notice of switching a fixed time before switching the communication network at the data reception source in the DRC creating section; and a data transmitting section that transmits the signals generated by the DRC creating section and the DSC creating section to the communication network.

A communication connection apparatus that connects a communication terminal apparatus to a communication network using radio includes, as one of characteristics, for example:

a data receiving section that receives data from the communication terminal apparatus;

a DRC judging section that receives the data from the data receiving section and extracts a DRC signal;

a DSC judging section that receives the data from the data receiving section and extracts a DSC signal;

a DSC/DRC transferring section that transmits results of the DRC judging section and the DSC judging section to the communication network;

a data accumulating section that accumulates data received from the communication network;

a data transmission processing section that extracts data from the data accumulating section on the basis of the results of the DRC judging section and the DSC judging section;

a NAK message analyzing section that receives the data from the data receiving section and extracts a NAK message for a retransmission request;

a data retransmission processing section that extracts data from the data accumulating section on the basis of a result of the NAK message analyzing section; and a data transmitting section that transmits the data of the data transmission processing section and the data retransmission processing section to the communication terminal apparatus.

A communication control apparatus that connects a communication connection apparatus to a communication network includes, as one of characteristics, for example:

a data receiving section that receives data from the communication connection apparatus;

a DRC judging section that receives the data from the data receiving section and extracts a DRC signal;

a DSC judging section that receives the data from the data receiving section and extracts a DSC signal;

a data accumulating section that accumulates data received from the communication network;

a data transmission processing section that extracts data from the data accumulating section on the basis of results of the DRC judging section and the DSC judging section;

a NAK message analyzing section that receives the data from the data receiving section and extracts a NAK message for a retransmission request;

a data retransmission processing section that extracts data from the data accumulating section on the basis of a result of the NAK message analyzing section; and a data transmitting section that transmits the data of the data transmission processing section and the data retransmission processing section to the communication connection apparatus.

A method of performing communication between a communication terminal apparatus and plural communication connection apparatuses connected using radio including, as one of characteristics:

in a process in which the communication terminal apparatus switches a communication destination from a first communication connection apparatus to a second communication connection apparatus, when data received from a communication network in a period until the second communication connection apparatus, which has received a DSC signal, receives a DRC signal are accumulated in the data accumulating section, latest data in the data accumulating section is transmitted to the communication terminal apparatus when a DRC signal transmitted by the communication terminal apparatus changes from designation of the first communication connection apparatus to designation of the second communication connection apparatus, and loss of data is detected in a data loss processing section of the communication terminal apparatus and a NAK message is transmitted by the communication connection apparatus, a data retransmission processing section of the communication connection apparatus transmits data not received by the communication terminal apparatus in accordance with the NAK message.

According to the first solving means of this invention, there is provided a communication method that uses a communication system including first and second communication connection apparatuses that communicate with a communication terminal by radio and a communication control apparatus that connects the first and the second communication connection apparatuses and a predetermined network, the communication method comprising:

a first data transmission step in which the first communication connection apparatus receives a DRC signal including an identifier of the first communication connection apparatus from the communication terminal and transmits communication data from the communication control apparatus to the communication terminal in accordance with the DRC signal;

a step in which the first communication connection apparatus receives the DRC signal including the identifier of the first communication connection apparatus and a DSC signal including an identifier of the second communication connection apparatus, which are transmitted due to select the second communication connection apparatus by the communication terminal as a switching destination of a communication destination, and transmits a sequence number of data following the communication data transmitted in the first data transmission step and the received DRC signal and the received DSC signal to the communication control apparatus;

a second data transmission step in which the first communication connection apparatus transmits communication data from the communication control apparatus to the communication terminal in accordance with the DRC signal;

a step in which the communication control apparatus transmits communication data of the sequence number received from the first communication connection apparatus and communication data of subsequent sequence numbers to the second communication connection apparatus in accordance with the DSC signal;

a accumulating step in which the second communication connection apparatus accumulates the communication data of the sequence number and the subsequent sequence numbers from the communication control apparatus;

a third data transmission step in which the second communication connection apparatus receives the DRC signal and the DSC signal including the identifier of the second communication connection apparatus from the communication terminal and transmits latest data or predetermined numbered data from the latest data among the communication data accumulated in the accumulating step;

a step in which the second communication connection apparatus receives, from the communication terminal, a retransmission request message for requesting lost data between the communication data received by the communication terminal in the first and the second data transmission step and the data received in the third data transmission step, the retransmission request message including a leading sequence number of the lost data; and a fourth data transmission step in which the second communication connection apparatus reads out communication data of the leading sequence number included in the received retransmission request message and subsequent sequence numbers among the communication data accumulated in the accumulating step and transmits the communication data to the communication terminal.

According to the second solving means of this invention, there is provided a communication system comprising:

a first communication connection apparatus that communicates with a communication terminal by radio;

a second communication connection apparatus that communicates with the communication terminal by radio due to Handoff of the communication terminal, which communicates with the first communication connection apparatus; and a communication control apparatus that connects the first and the second communication connection apparatuses and a predetermined network, wherein the first communication connection apparatus receives a DRC signal including an identifier of the first communication connection apparatus from the communication terminal and transmits communication data from the communication control apparatus to the communication terminal in accordance with the DRC signal;

the first communication connection apparatus receives the DRC signal including the identifier of the first communication connection apparatus and a DSC signal including an identifier of the second communication connection apparatus, which are transmitted due to select the second communication connection apparatus by the communication terminal as a switching destination of a communication destination, and transmits a sequence number of data following the communication data transmitted to the communication terminal and the received DRC signal and the received DSC signal to the communication control apparatus;

the first communication connection apparatus transmits the communication data from the communication control apparatus to the communication terminal in accordance with the DRC signal;

the communication control apparatus transmits communication data of the sequence number received from the first communication connection apparatus and communication data of subsequent sequence numbers to the second communication connection apparatus in accordance with the DSC signal;

the second communication connection apparatus accumulates the communication data of the sequence number and the subsequent sequence numbers from the communication control apparatus;

the second communication connection apparatus receives the DRC signal and the DSC signal including the identifier of the second communication connection apparatus from the communication terminal and transmits latest data or predetermined numbered data from the latest data among the communication data accumulated;

the second communication connection apparatus receives, from the communication terminal, a retransmission request message for requesting lost data between the communication data received by the communication terminal from the first communication connection apparatus and the latest data or the predetermined numbered data from the latest data, the retransmission request message including a leading sequence number of the lost data; and the second communication connection apparatus reads out communication data of the leading sequence number included in the received retransmission request message and subsequent sequence numbers among the communication data accumulated and transmits the communication data to the communication terminal.

According to this invention, it is possible to provide a communication method and a communication system that can prevent redundant transmission of data in a radio section and a delay of data arrival due to retransmission while inheriting the effect of reduction in a no-communication period. According to this invention, it is possible to, as a method with which a BS at a Handoff destination judges a head of data, from which transmission to an AT should be started, out of data accumulated in the BS itself, use a Nak message from the AT and, compared with the conventional system using only DSC, to make it possible to prevent redundant data from being transmitted in a radio section to improve efficiency of use of the radio section.

According to this invention, it is possible to shift a function of retransmitting data using the Nak message from the BSC to the BS and reduce time until the AT receives retransmission data from the Nak message transmission compared with the conventional system of retransmitting data from the BSC. According to this invention, it is possible to, such that there is no shortage in the data accumulated in the Handoff destination BS at the time of DRC switching, transmit missing data from the BSC to the Handoff destination BS with DSC switching as an opportunity to make it easy to realize the effects of the invention even in a situation in which a switching time is short.

According to this invention, it is possible to, since the retransmission function by the Nak message is a function already provided in the AT and the invention does not need to add a new function to a large number of ATs compared with the BS and the BSC and spread the ATs, make it possible to quickly expand the invention to the market.

DESCRIPTION OF THE PREFERRED
EMBODIMENTS OF THE INVENTION

A communication terminal apparatus, a communication connection apparatus, and a communication control apparatus as well as a communication system and a communication method that use these apparatuses according to an embodiment of the invention will be hereinafter explained in detail using the drawings.

(System Structure)

Figure 1:
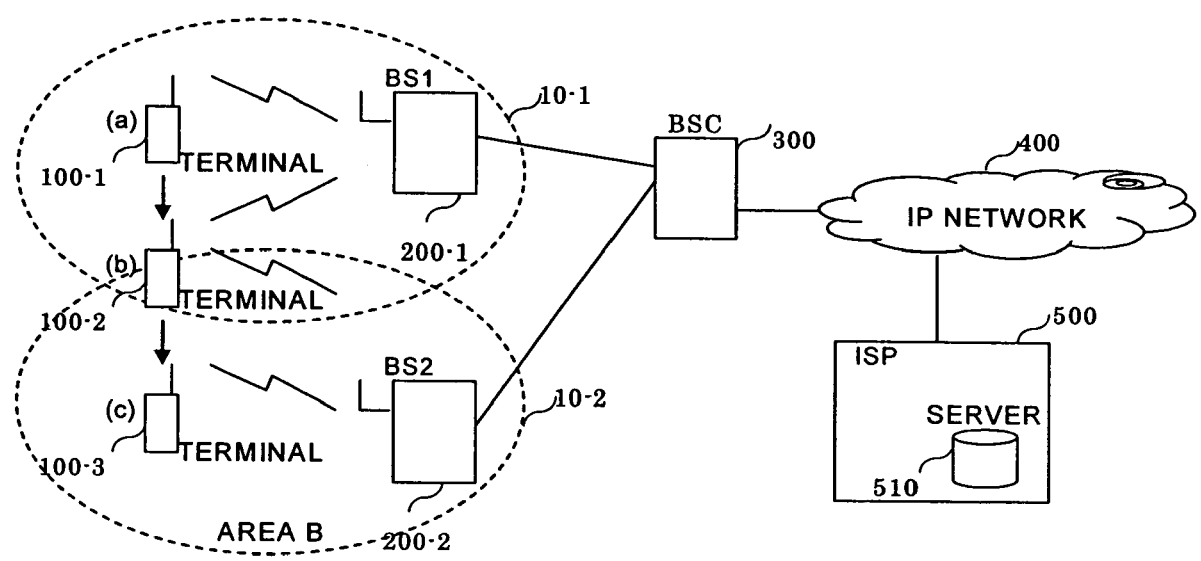
FIG. 1 is a network diagram showing an example of a structure of a communication system that uses a communication terminal apparatus, a communication connection apparatus, and a communication control apparatus.

FIG. 1 is a network diagram showing an example of a structure of the communication system that uses the communication terminal apparatus, the communication connection apparatus, and the communication control apparatus according to this embodiment. The communication system includes a radio terminal 100 serving as a communication terminal apparatus, Base Stations (BSs) 200 serving as communication connection apparatuses that connect the radio terminal 100 and a radio link, a Base Station controller (BSC) 300 serving as a communication control apparatus that connects the plural BSs 200 and an IP network 400 such as the Internet, and an Internet Service Provider (ISP) 500 that exchanges application data through the IP network 400. The ISP 500 has, for example, a server 510 that accumulates data.

The BSs 200 are fixed stations and cannot move. As indicated by areas 10, a range in which the BSs 200 can communicate with the radio terminal 100 with the radio link is limited. In order to cover an area of a wide range, the plural BSs 200 are set. When the radio terminal 100 moves, the radio link is switched to a certain BS 200-1 (a first communication connection apparatus) to another BS 200-2 (a second communication connection apparatus) to maintain the connection of the radio terminal 100 and the ISP 500. For example, a radio terminal 100-1 in an area 10-1 communicates with the BS 200-1 first. When the radio terminal 100 moves from (a) to (b) in the figure, the radio terminal 100 communicates with both the BS 200-1 and the BS 200-2. A radio terminal 100-2, which has moved from (b) to (c) in the figure, finally communicates with the BS 200-2. In the following explanation, the communication system shown in FIG. 1 will be explained as an example.

Figure 2:
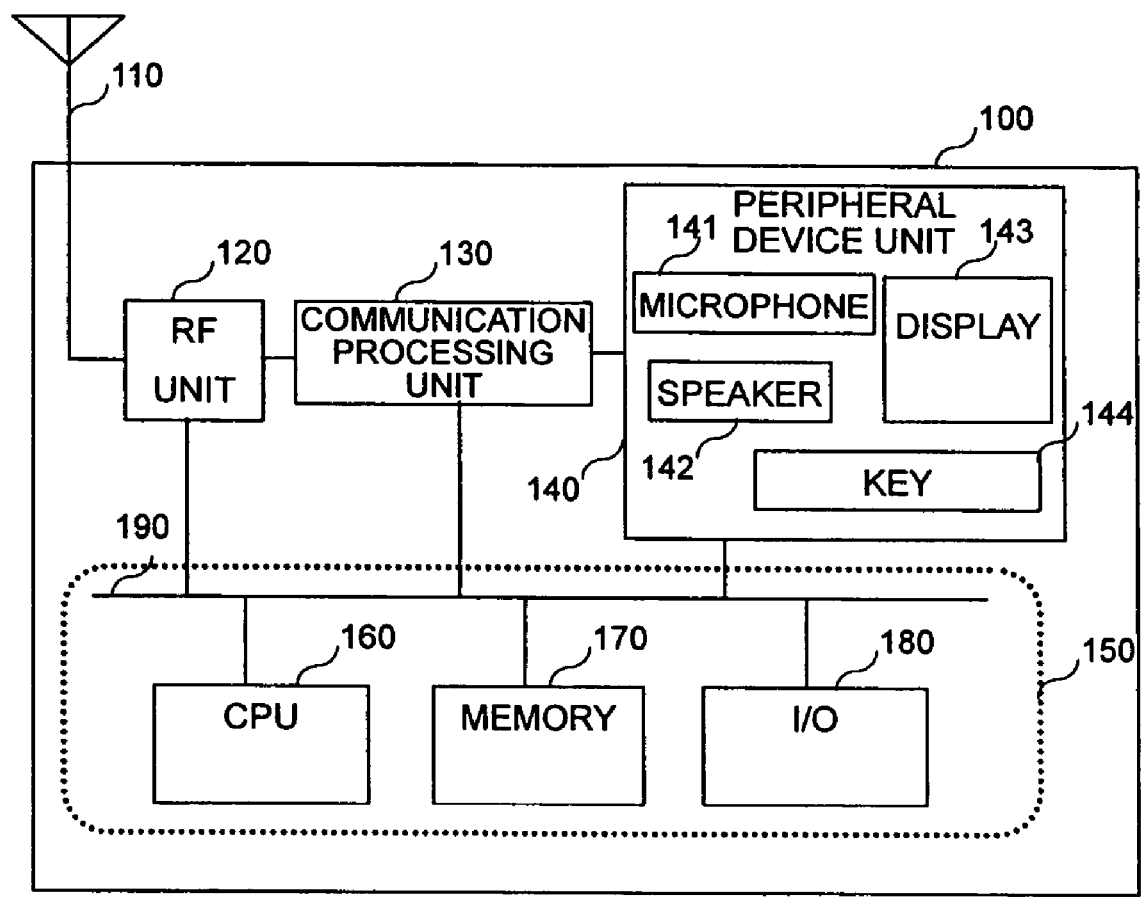
FIG. 2 is a functional diagram showing an example of a hardware function configuration of the communication terminal apparatus.
Figure 3:
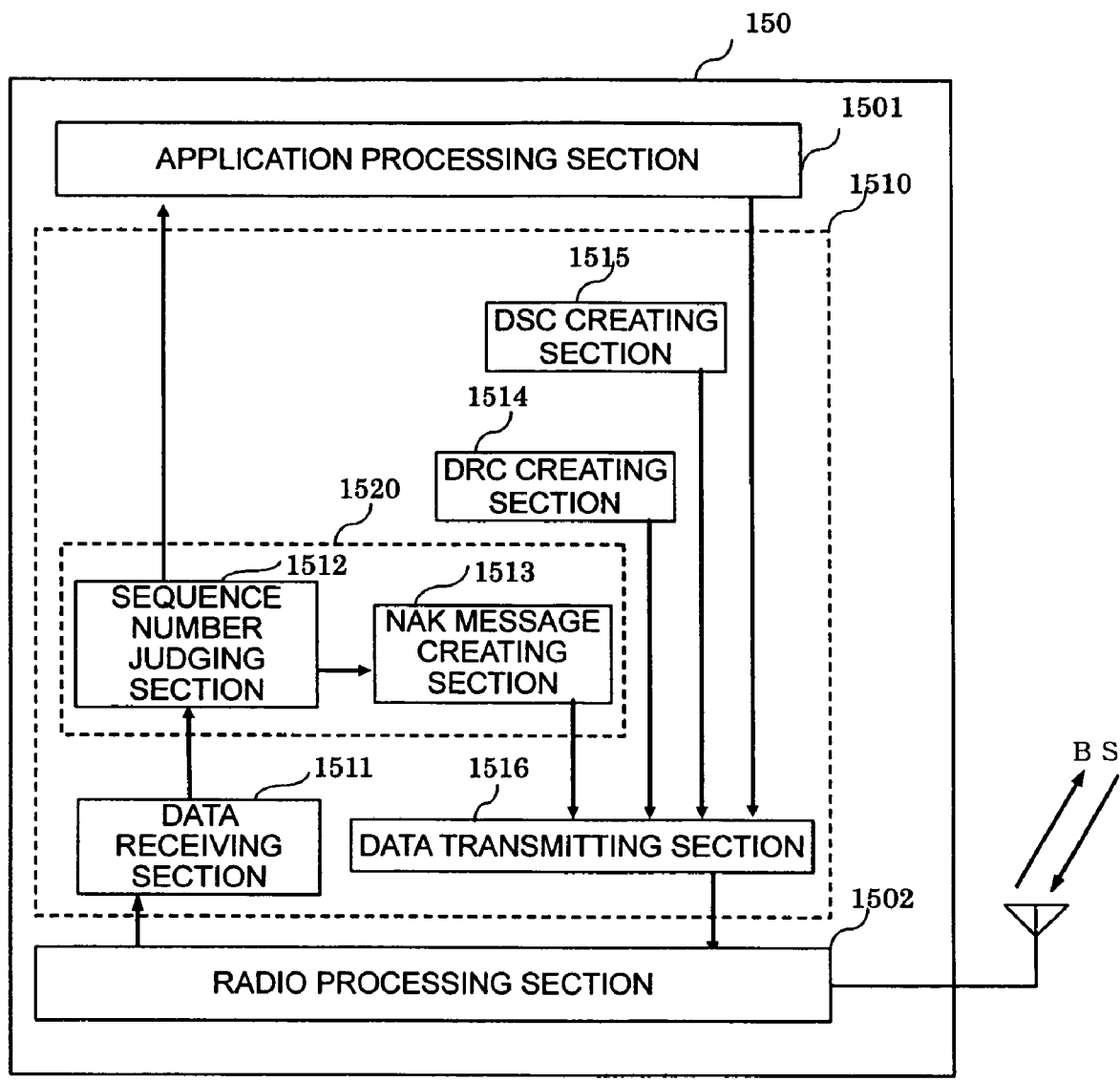
FIG. 3 is a functional diagram showing an example of a software function configuration of the communication terminal apparatus.

FIGS. 2 and 3 are block diagrams showing an example of a structure of the communication terminal apparatus 100. FIG. 2 is a block diagram showing a hardware configuration of the communication terminal apparatus 100. The communication terminal apparatus 100 includes, for example, an antenna 110 that transmits and receives a radio signal; an RF (Radio Frequency) unit 120 that converts the radio signal into an electric signal, a communication processing unit 130 that applies predetermined communication processing (signal termination, protocol conversion, failure monitoring, etc.) to the electric signal, a peripheral device unit 140 that performs input and output of signals transmitted and received by an owner of the terminal, and a control unit 150 that performs control of the entire communication terminal apparatus 100.

The peripheral device unit 140 has, for example, a microphone 141 for inputting sound, a speaker 142 that outputs sound, a display 143 that displays characters and images, and a key 144 for performing data input and control signal input (designation of a connection destination, etc.). The control unit 150 has a CPU 160 serving as a processor that controls operations of the entire communication terminal apparatus 100, a memory 170 that accumulates operation programs and various data necessary for operations, and an I/O 180 that transmits and receives signals to and from external apparatuses. A control line 190 connects the respective blocks described above.

FIG. 3 is a functional block diagram showing an example of a software configuration of the communication terminal apparatus 100. The communication terminal apparatus 100 includes a radio processing section 1502 that performs radio communication with the BSs 200, a radio session section 1510 that performs communication of a radio session with the BSs 200 and the BSC 300, and an application processing section 1501 that processes an application using data received.

The radio session section 1510 further includes a data receiving section 1511 that receives frame data from the radio processing section 1502, a sequence number judging section 1512 that extracts a sequence number from the frame data received and judges loss of data, a Nak message creating section 1513 that creates a Nak message (a retransmission request) for data retransmission to be sent to the BSs 200 and the BSC 300 on the basis of a result of the sequence number judging section 1512, a DRC creating section 1514 that determines an optimum communication destination according to a reception state of a radio wave out of the plural BS 200 and creates a DRC signal for notification to the communication destination, a DSC creating section 1515 that creates a DSC signal for giving a notice of switching before switching the BS 200 serving as the communication destination to another BS 200, and a data transmitting section 1516 for notifying the radio processing section 1502 of data and messages generated by the application processing section 1501, the Nak message creating section 1513, the DRC creating section 1514, and the DSC creating section 1515. When it is judged by the sequence number judging section 1512 that there is no loss in the data from the data receiving section 1511, the data is transferred to the application processing section 1501. In this embodiment, the sequence number judging section 1512 and the Nak message creating section 1513 are collectively referred to as a data loss processing section 1520.

Figure 4:
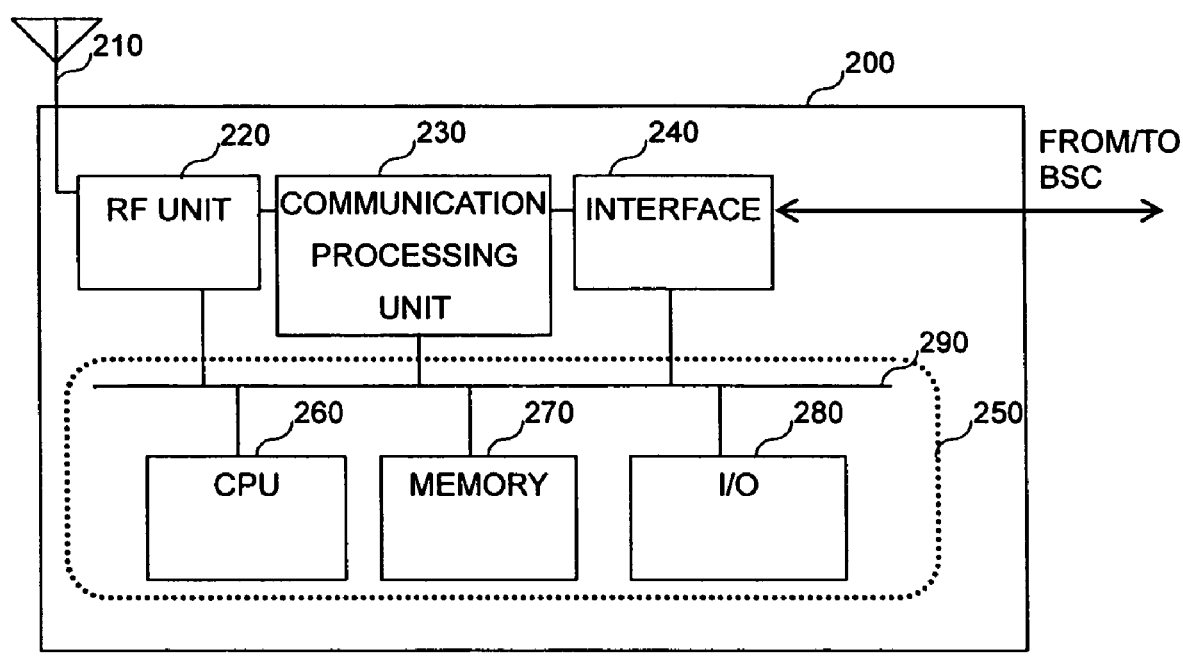
FIG. 4 is a functional diagram showing an example of a hardware function configuration of the communication connection apparatus (BS: Base Station)
Figure 5:
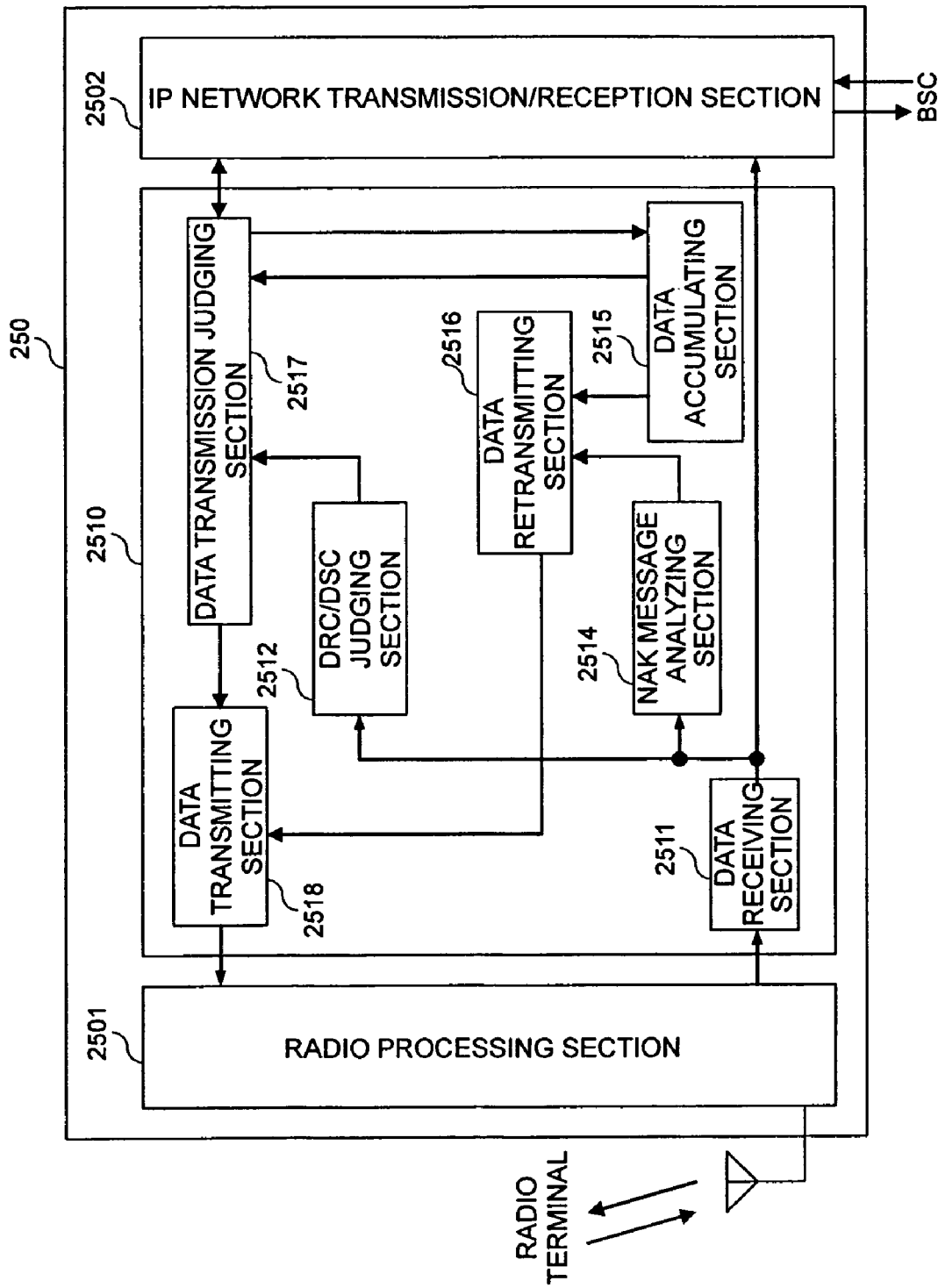
FIG. 5 is a functional diagram showing an example of a software function configuration of the communication connection apparatus (BS: Base station)

FIGS. 4 and 5 are block diagrams showing an example of a structure of the communication connection apparatus (the base station, BS) 200. FIG. 4 is a block diagram showing a hardware configuration of the BS 200. The BS 200 includes, for example, an antenna 210 that transmits and receives a radio signal, an RF unit 220 that converts the radio signal into an electric signal, a communication processing unit 230 that applies predetermined communication processing (signal termination, protocol conversion, failure monitoring, etc.) to the electric signal, an interface 240 that transmits and receives signals to and from the BSC 300, and a control unit 250 that performs control of the entire BS 200. The control unit 250 has a CPU 260 serving as a processor that controls operations of the entire BS 200, a memory 270 that accumulates operation programs and various data necessary for operations, and an I/O 280 that transmits and receives signals to and from external apparatuses. The control line 290 connects the respective blocks described above.

FIG. 5 is a functional diagram showing an example of a software configuration of the BS 200. The BS 200 includes, for example, a radio processing section 2501 that performs radio communication with the communication terminal apparatus 100, a radio session section 2510 that performs communication of a radio session with the communication terminal apparatus 100 and the BSC 300, and an IP network transmission/reception section 2502 that performs communication by a wired line with the BSC 300.

The radio session section 2510 further includes a data receiving section 2511 that receives data from the radio communication section 2501, a DRC/DSC judging section 2512 that extracts a DRC signal and a DSC signal from the data received by the data receiving section 2511 and judges whether the DRC signal and the DSC signal are transmitted to the own BS or another BS, a Nak message analyzing section 2514 that extracts a Nak message, which is a retransmission notice from a radio terminal, from the data received by the data receiving section 2511 and analyzes the message, a data accumulating section 2515 that accumulates data received from the IP network transmission/reception section 2502, a data retransmitting section 2516 that determines data, which should be retransmitted, on the basis of a result of the Nak message analyzing section 2514 and extracts data from the data accumulating section 2515, a data transmission judging section 2517 that extracts data from the IP network transmission/reception section 2502 or the data accumulating section 2515 on the basis of a result of the DRC/DSC judging section 2512, and a data transmitting section 2518 that transmits the data of the data retransmitting section 2516 and the data transmission judging section 2517 to the radio processing section 2501.

The data receiving section 2511 transmits the DRC signal, DSC signal, the Nak message, and the other data received from the communication terminal apparatus 100 to the IP network transmission/reception section 2502. The DRC signal, the DSC signal, and the Nak message to the DRC/DSC judging section 2512 and the Nak message analyzing section 2514 can be copied and sent to the respective sections. The IP network transmission/reception section 2502 transmits the data received from the data receiving section 2511 to the communication control apparatus 300. The data that the IP network transmission/reception section 2502 received from the communication control apparatus 300 is transmitted to the data transmission judging section 2517 and, at the same time, transmitted to the data accumulating section 2515 and accumulated.

Figure 6:
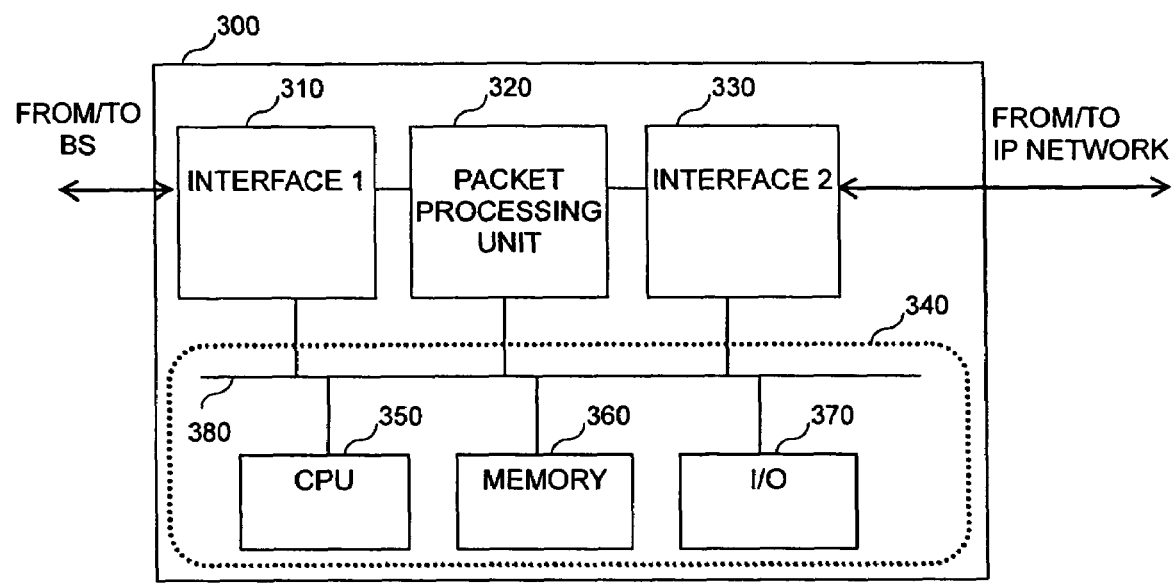
FIG. 6 is a functional diagram showing an example of a hardware function configuration of the communication control apparatus (BSC: Base Station controller)
Figure 7:
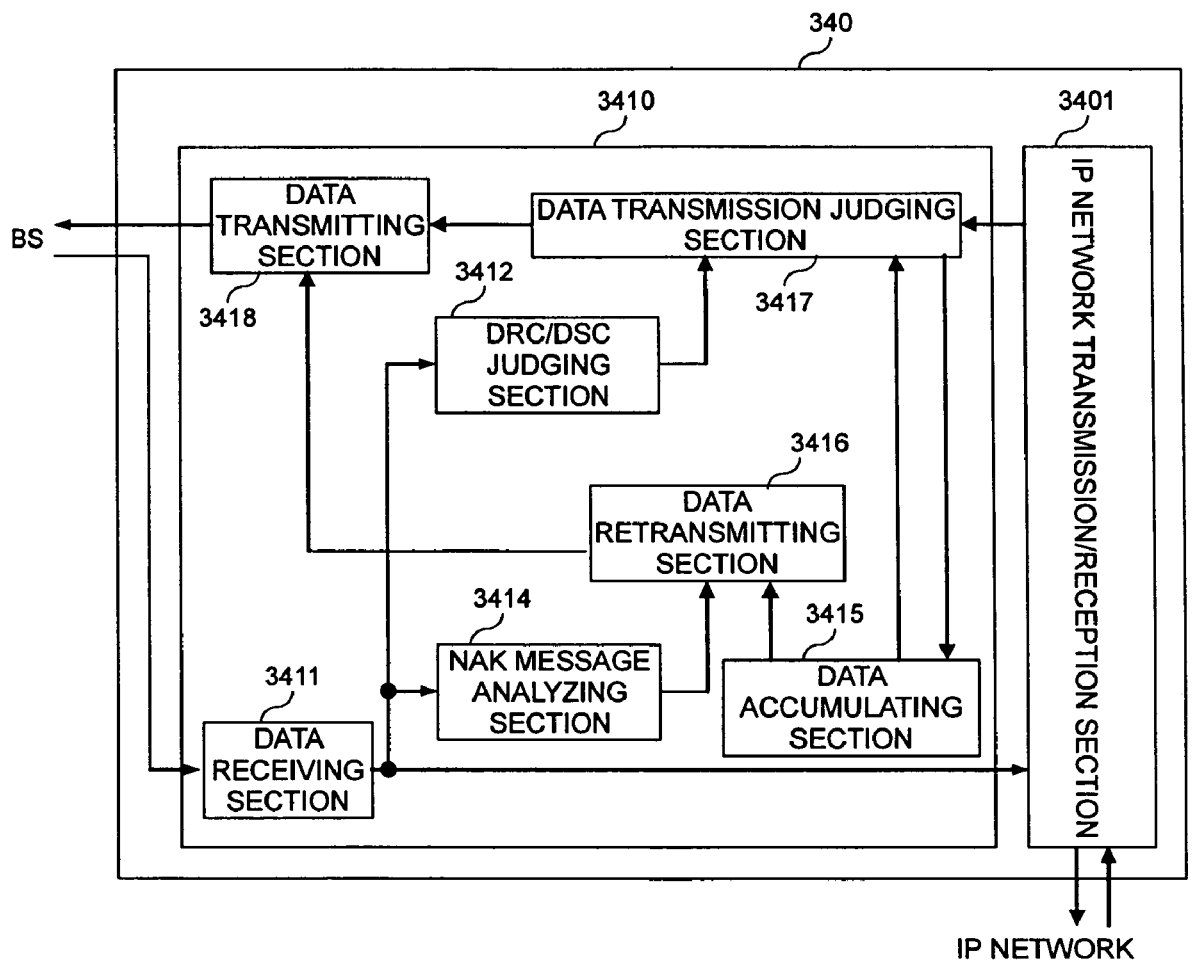
FIG. 7 is a functional diagram showing an example of a hardware function configuration of the communication control apparatus (BSC: Base Station Controller)

FIGS. 6 and 7 are block diagrams showing an example of a structure of the communication control apparatus (BSC) 300. FIG. 6 is a block diagram showing a hardware configuration of the BSC 300. The BSC 300 includes, for example, an interface 310 with the BS 200, an interface 330 with an IP network such as the Internet, a packet processing unit 320 that applies signal processing such as switching to signals transmitted and received between these interfaces, and a control unit 340 that performs control of the entire BSC 300. The control unit 340 has a CPU 350 serving as a processor that controls operations of the entire BSC 300, a memory 360 that accumulates operation programs and various data necessary for operations, and an I/O unit 370 that transmits and receives signals to and from external apparatuses. A control line 380 connects the respective blocks described above.

FIG. 7 is a functional diagram showing an example of a software configuration of the BSC 300. The control unit 340 of the BSC 300 includes a radio session section 3410 that performs communication of a radio session with the plural BSs 200 via an IP network or the like and an IP network transmission/reception section 3401 that performs communication by a wired line with the IP network 400.

The radio session section 3410 includes a data receiving section 3411 that receives data from the BS 200, a DRC/DSC judging section 3412 that extracts a DRC signal and a DSC signal from the data received by the data receiving section 3411 and judges a BS to which the data should be transmitted, a Nak message analyzing section 3414 that extracts a Nak message, which is a retransmission notice from the radio terminal 100, from the data received by the data receiving section 3411 and analyzes the message, a data accumulating section 3415 that accumulates data received from the IP network transmission/reception section 3401, a data retransmitting section 3416 that determines data, which should be retransmitted, on the basis of a result of the Nak message analyzing section 3414 and extracts data from the data accumulating section 3415, a data transmission judging section 3417 that extracts data from the IP network transmission/reception section 3401 or the data accumulating section 3415 on the basis of a result of the DRC/DSC judging section 3412 and determines a BS at a transmission source, and a data transmitting section 3418 that transmits the data of the data retransmitting section 3416 and the data transmission judging section 3417 to the communication connection apparatus 200, which is the transmission destination determined in accordance with the data transmission judging section 3417.

The data receiving section 3411 does not transfer the DRC signal, the DSC signal, and the Nak message received from the communication connection apparatus 200 to the IP network transmission/reception section. The data receiving section 3411 transmits the data other than the signals and the message received from the BS 200 to the IP network transmission/reception section 3401. The IP network transmission/reception section 3401 transmits the data received from the data receiving section 3411 to the IP network 400. The data that the IP network transmission/reception section 3401 received from the IP network 400 is transmitted to the data transmission judging section 3417 and transmitted to the data accumulating section 3415 and accumulated.

The respective radio session sections 1510, 2510, and 3410, the application processing section 1501, and the respective function blocks included in the communication terminal apparatus 100, the communication connection apparatus 200, and the communication control apparatus 300 shown in FIGS. 2, 4, and 6 can be realized by the processors (CPUs) and software stored in memories or the like in the control units of the respective apparatuses. However, a part or all of the functions may be realized by hardware. In the following explanation, it is assumed that the respective function blocks are driven by the CPUs and the memories or the hardware in the control units to perform apparatus operations such as retransmission and connection control with a BS.

(Data Format)

Figure 8:
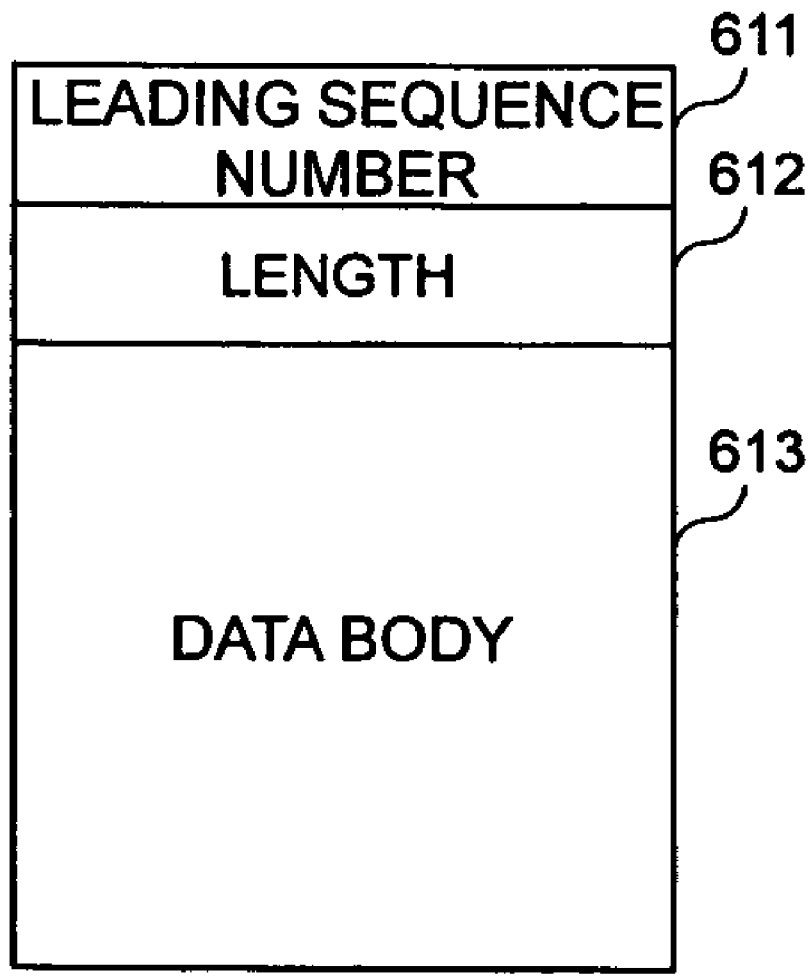
FIG. 8 is a frame diagram showing an example of a structure of data transmitted and received among the communication terminal apparatus, the communication connection apparatus, and the communication control apparatus.

FIG. 8 is a frame diagram showing an example of a structure of data. The data includes frames of a data body 613, a leading sequence number 611 of a leading data of the data, and Length 612 that is length of the data body 613. The leading sequence number 611 is incremented, for example, by one for each data byte.

FIG. 9 is a frame diagram showing examples of structures of a Nak message and a DRC/DSC signal message. FIG. 9(*a*) is a frame diagram showing an example of a structure of a Nak message transmitted and received between the communication terminal apparatus 100 and the BS 200. The Nak message includes frames of a leading sequence number 711 of data in which loss has occurred and a Length 712 indicating length of the data in which loss has occurred. The leading sequence number 711 is incremented by one for each data byte.

FIG. 9(*b*) is a frame diagram showing an example of a structure of a Nak message transmitted and received between the BS 200 and the BSC 300. A Nak-processed flag 713 is granted to the top of FIG. 9(*a*). For example, the Nak-processed flag 713 is turned on when retransmission processing for Nak has been carried out in the BS 200 and is turned off when the retransmission processing for Nak has not been carried out. FIG. 9(*c*) is a frame diagram showing an example of a structure of a DRC/DSC signal message transmitted and received between the BS 200 and the BSC 300. The DRC/DSC signal message includes a latest transmission-waiting sequence number 720, a DRC signal value 721, and a DSC signal value 722. Meanings of these values will be described later.

(Operations)

Figure 10:
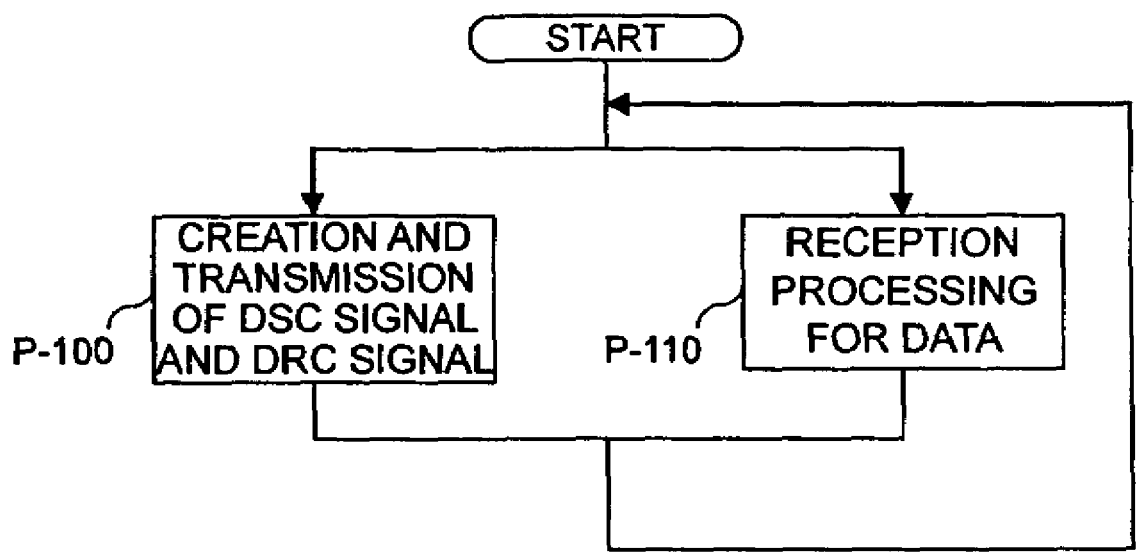
FIG. 10 is an operation flow diagram (1) showing an example of operations of the communication terminal apparatus.
Figure 11:
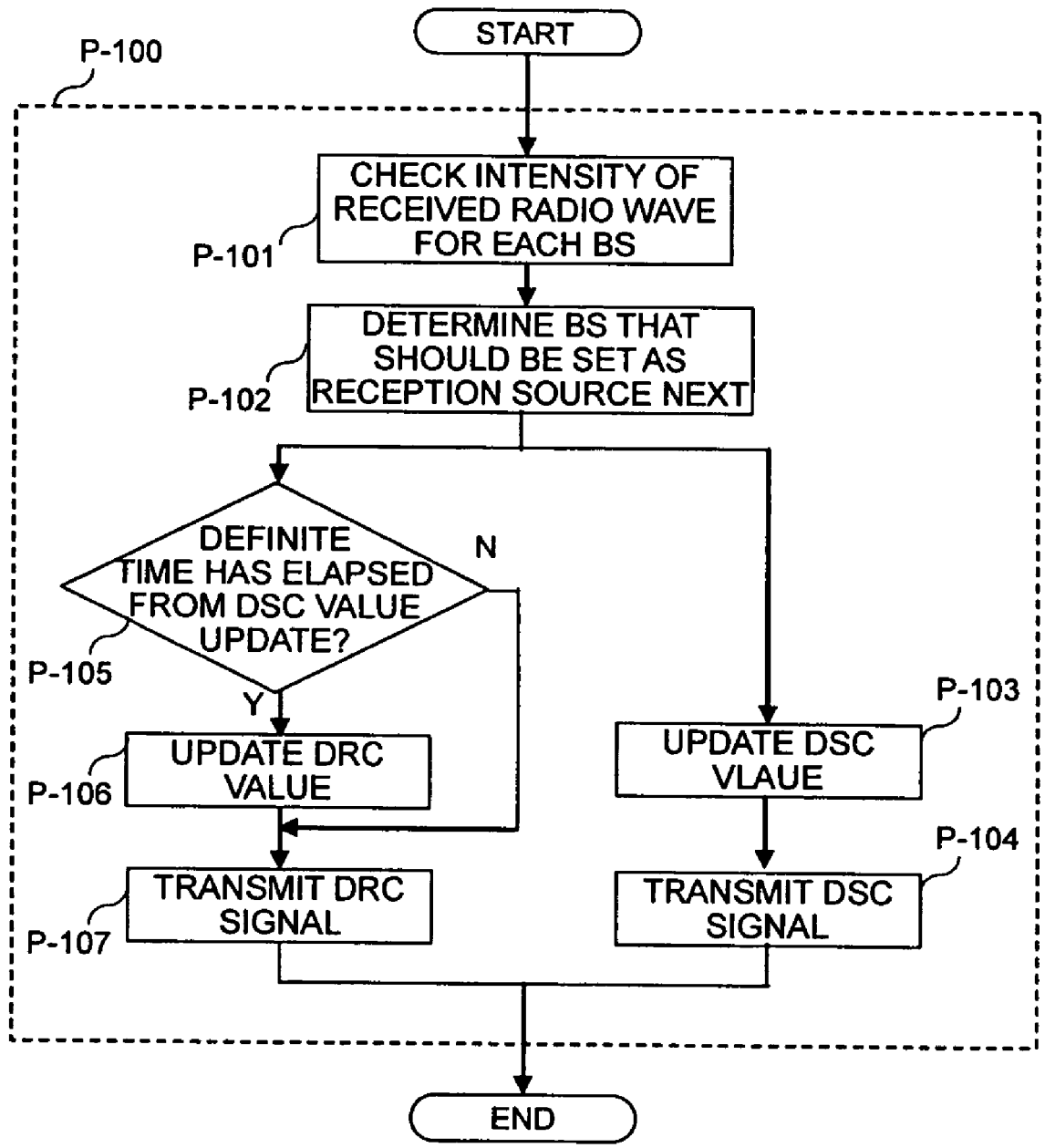
FIG. 11 is an operation flow diagram (2) showing an example of operations of the communication terminal apparatus.
Figure 12:
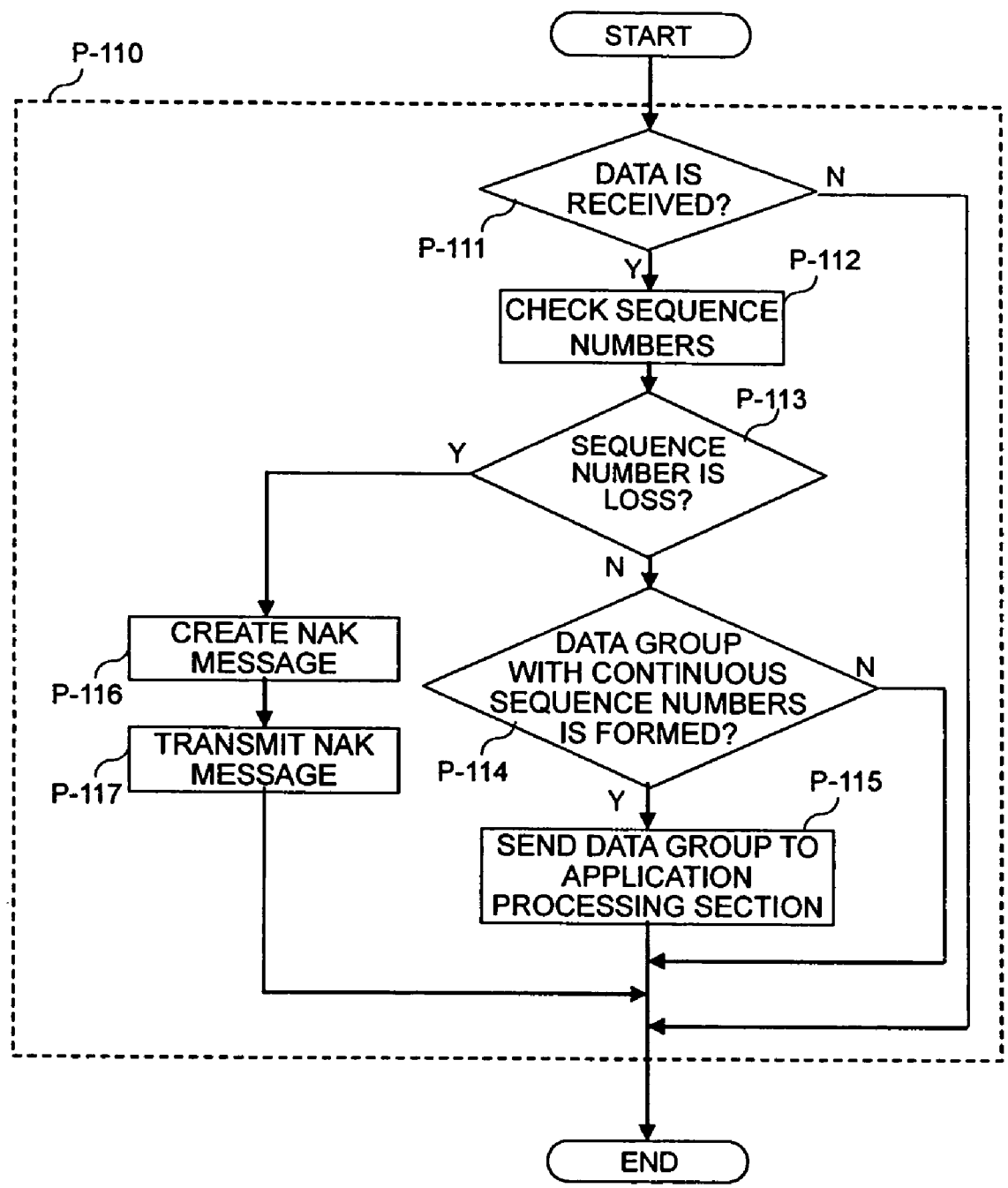
FIG. 12 is an operation flow diagram (3) showing an example of operations of the communication terminal apparatus.

FIGS. 10 to 12 are operation flow diagrams showing examples of operations of the communication terminal apparatus 100. FIG. 10 is an overview of an operation flow. The operation flows includes creation and transmission processing for a DRC signal and a DSC signal (P-100) and reception processing for data (P-110). For example, the creation and transmission processing and the reception processing are carried out in parallel. FIG. 11 is a detailed operation flow diagram of step P-100. FIG. 12 is a detailed operation flow diagram of step P-110.

Figure 13:
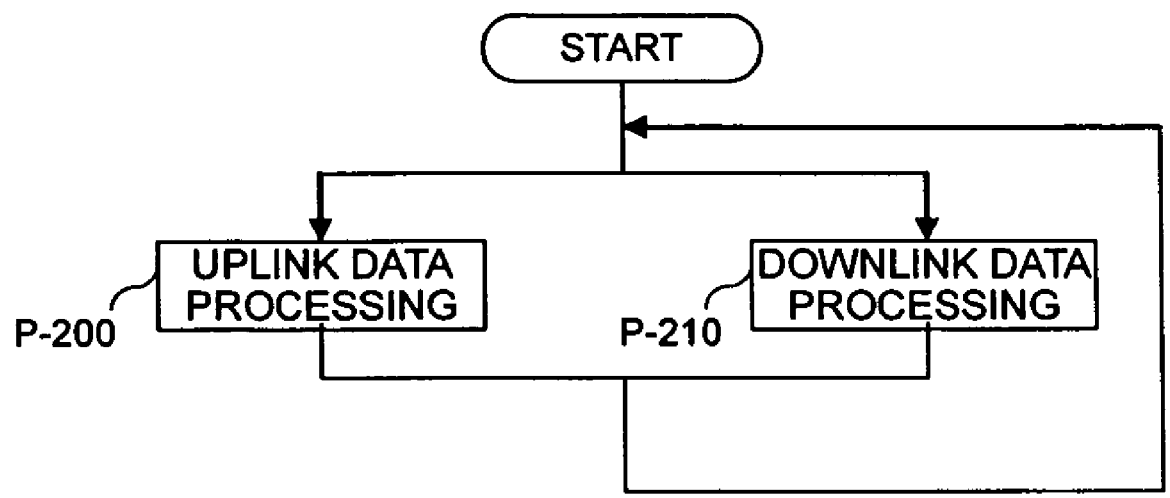
FIG. 13 is an operation flow diagram (1) showing an example of operations of the communication connection apparatus.
Figure 14:
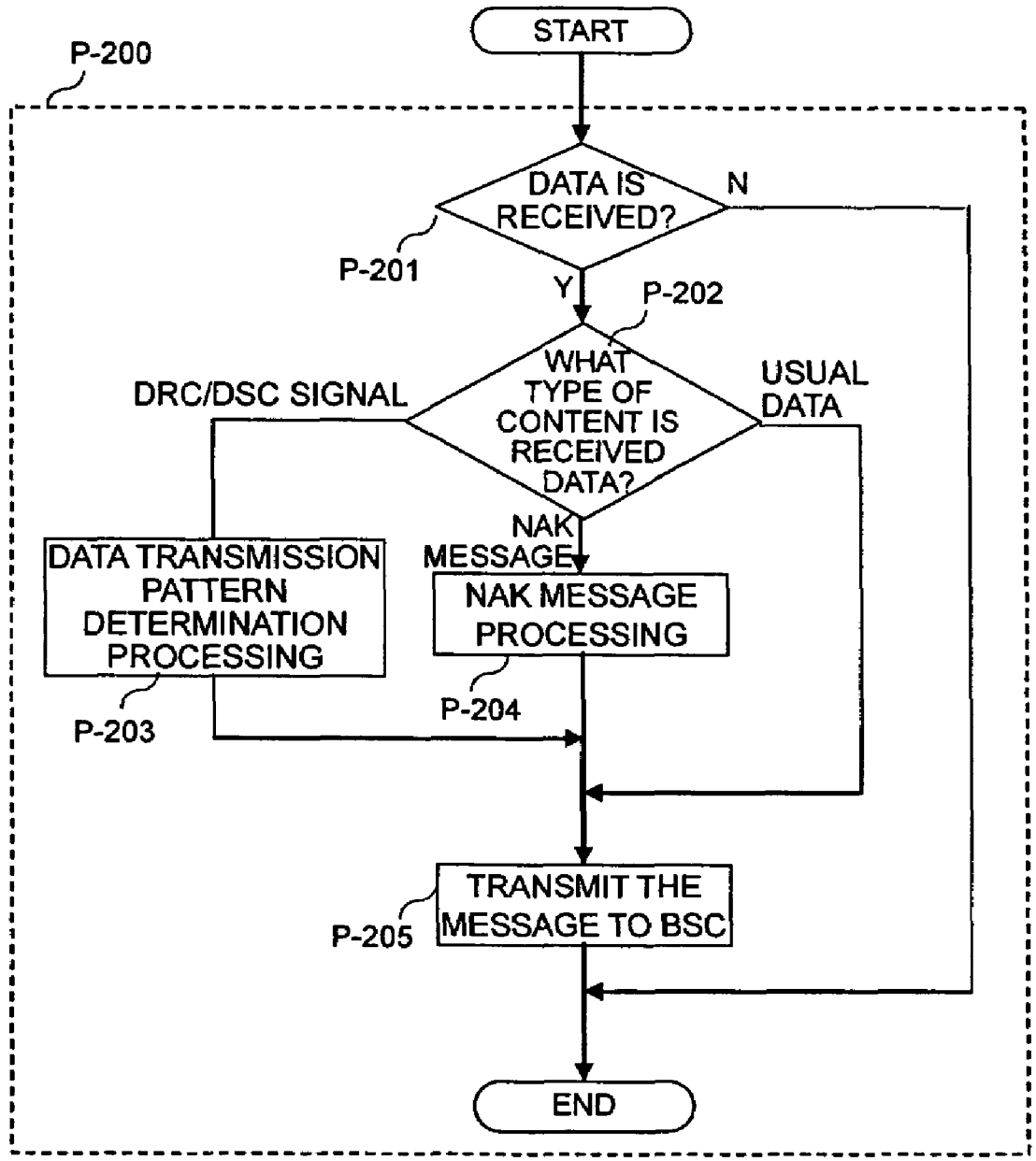
FIG. 14 is an operation flow diagram (2) showing an example of operations of the communication connection apparatus.
Figure 15:
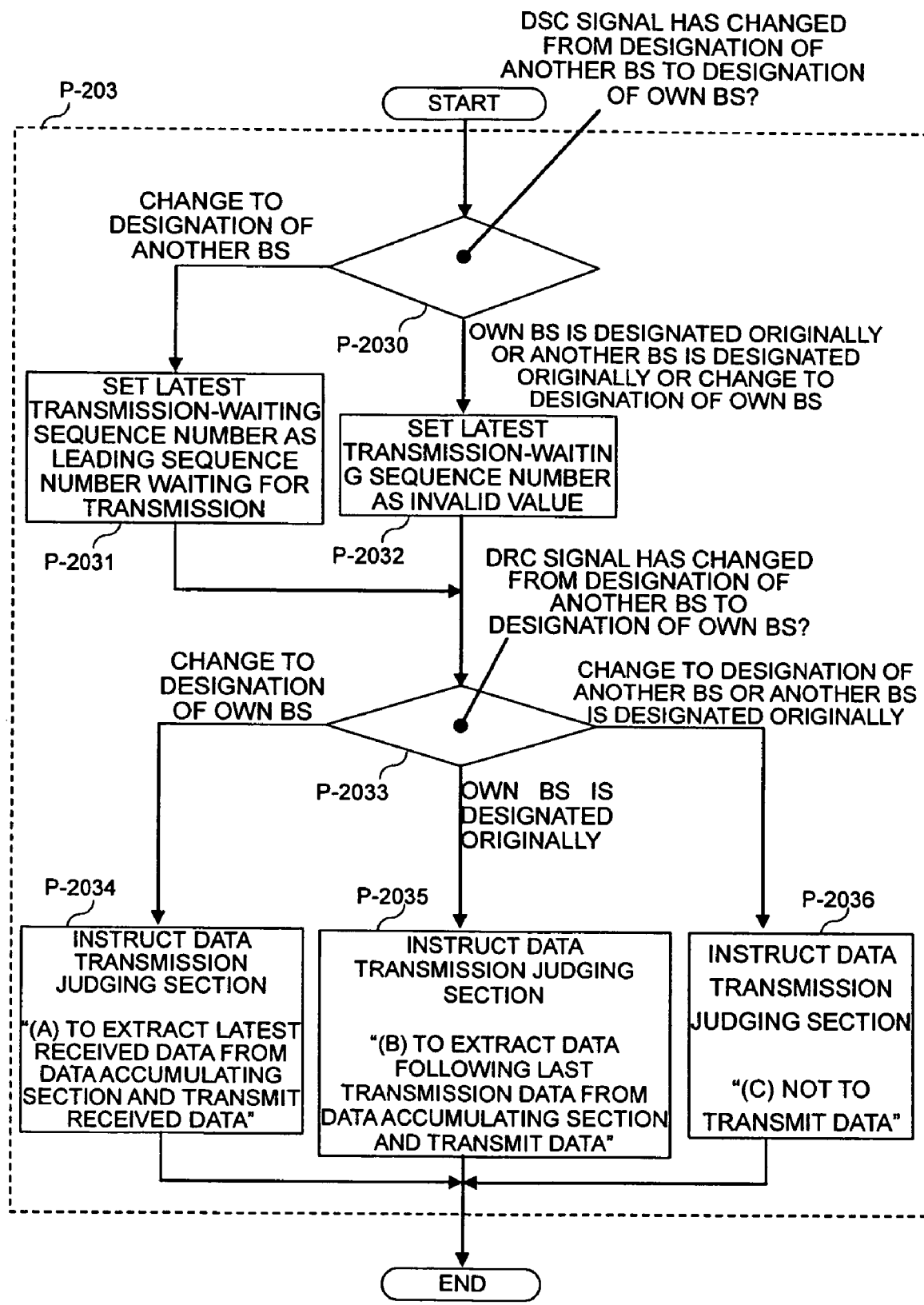
FIG. 15 is an operation flow diagram (3) showing an example of operations of the communication connection apparatus.
Figure 16:
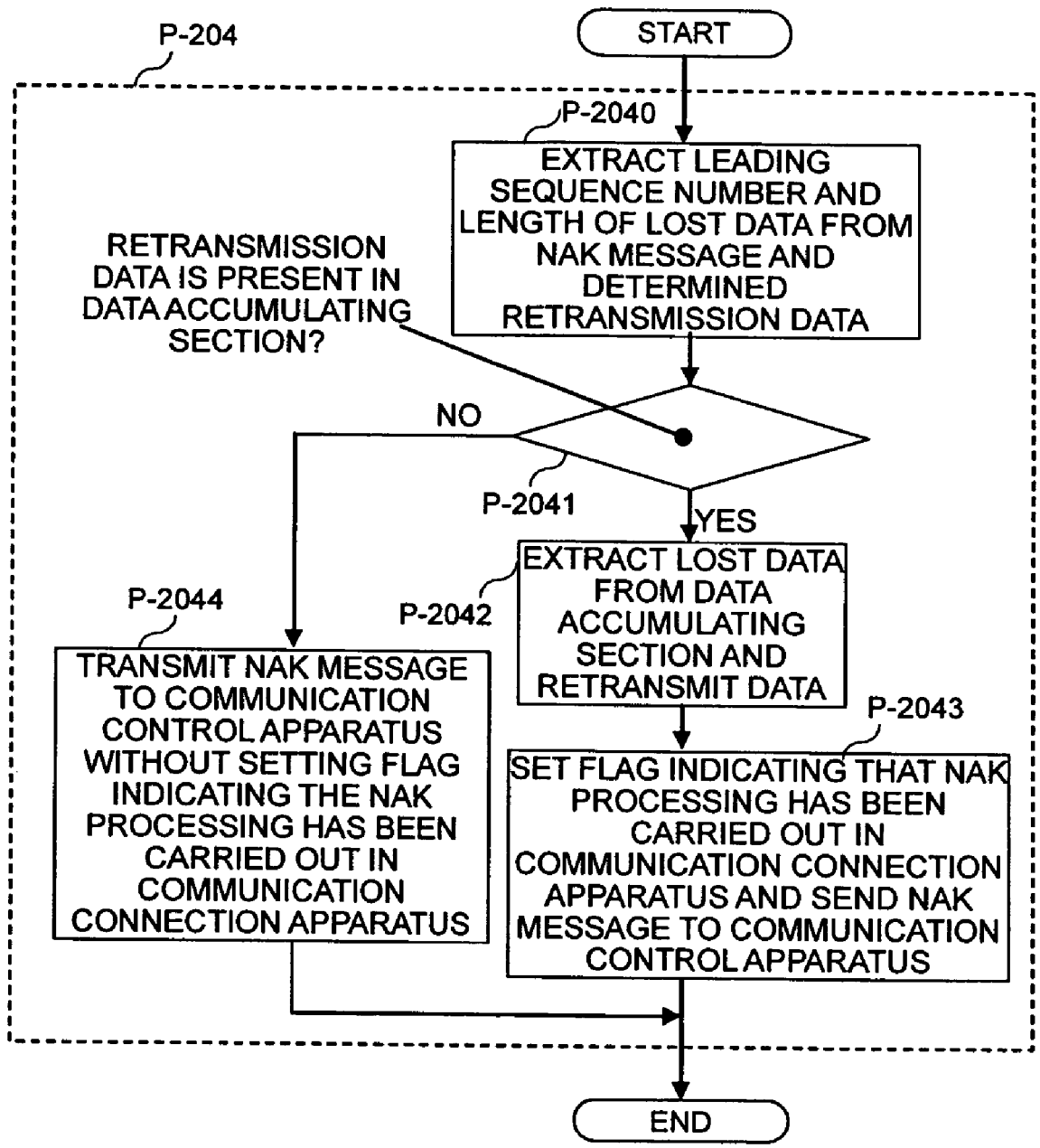
FIG. 16 is an operation flow diagram (4) showing an example of operations of the communication connection apparatus.
Figure 17:
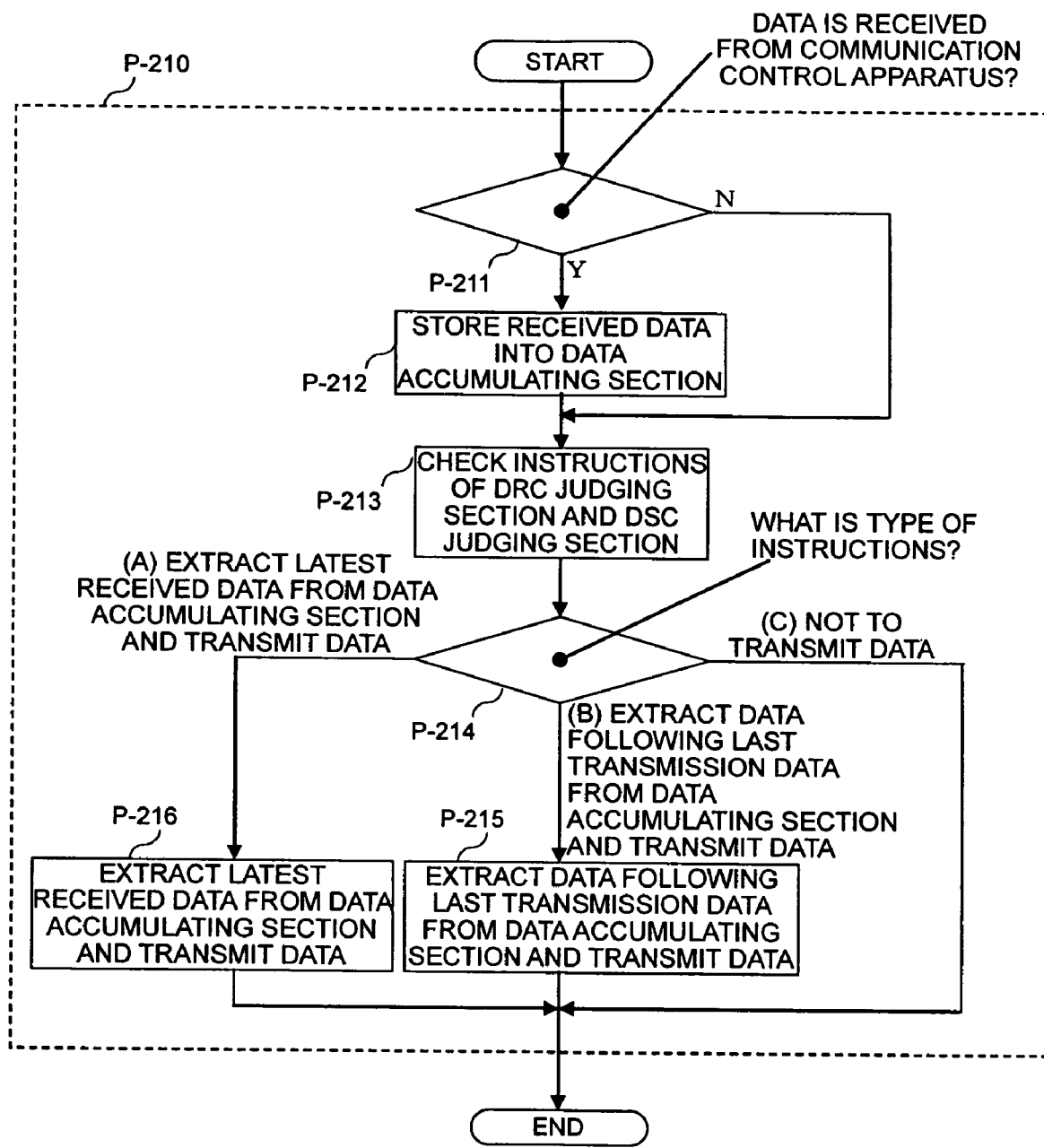
FIG. 17 is an operation flow diagram (5) showing an example of operations of the communication connection apparatus.

FIGS. 13 to 17 are operation flow diagrams showing examples of operations of the communication connection apparatus 200. FIG. 13 is an overview of an operation flow. The operation flow includes uplink data processing (P-200) for processing a flow of data and a message from the communication terminal apparatus 100 to the ISP 500 and downlink data processing (P-210) for processing a flow of data and a message from the ISP 500 to the communication terminal apparatus 100. For example, the uplink data processing and the downlink data processing are carried out in parallel. FIG. 14 is a detailed operation flow diagram of the uplink data processing (P-200). FIGS. 15 and 16 are operation flow diagrams in which a part (P-203 and P-204) of the uplink data processing (P-200) is described more in detail. FIG. 17 is a detailed operation flow diagram of the downlink data processing (P-210).

Figure 18:
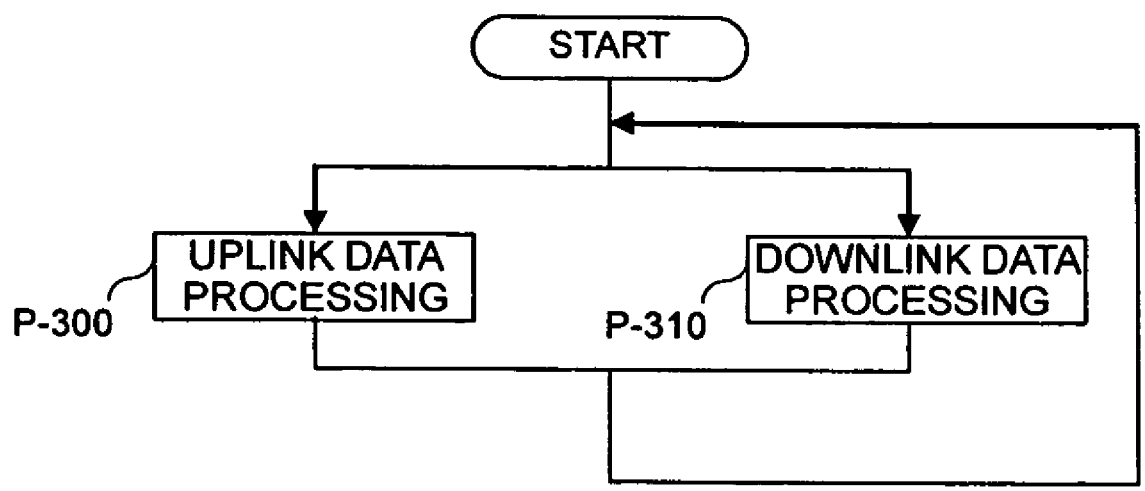
FIG. 18 is an operation flow diagram (1) showing an example of operations of the communication control apparatus.
Figure 19:
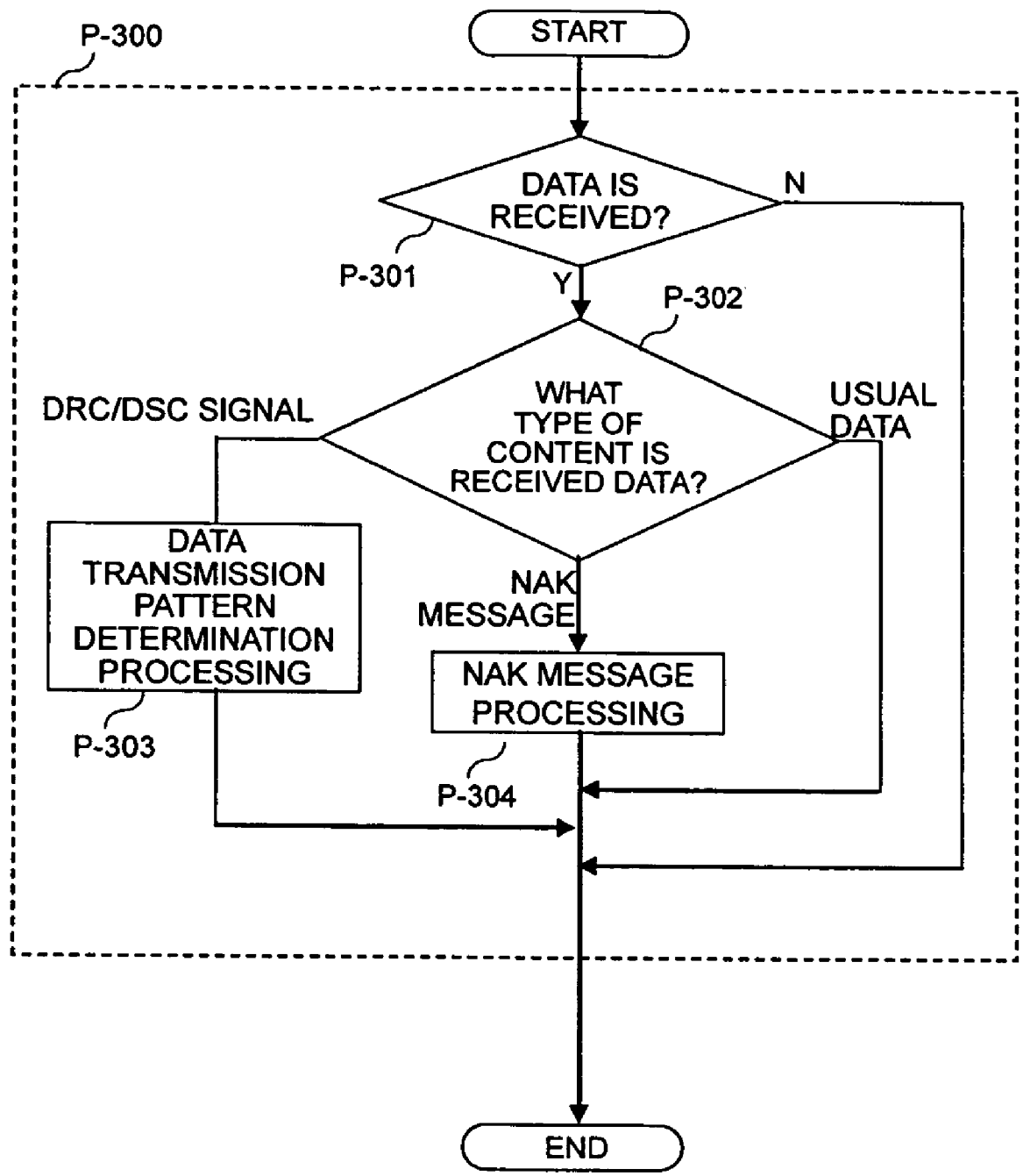
FIG. 19 is an operation flow diagram (2) showing an example of operations of the communication control apparatus.
Figure 20:
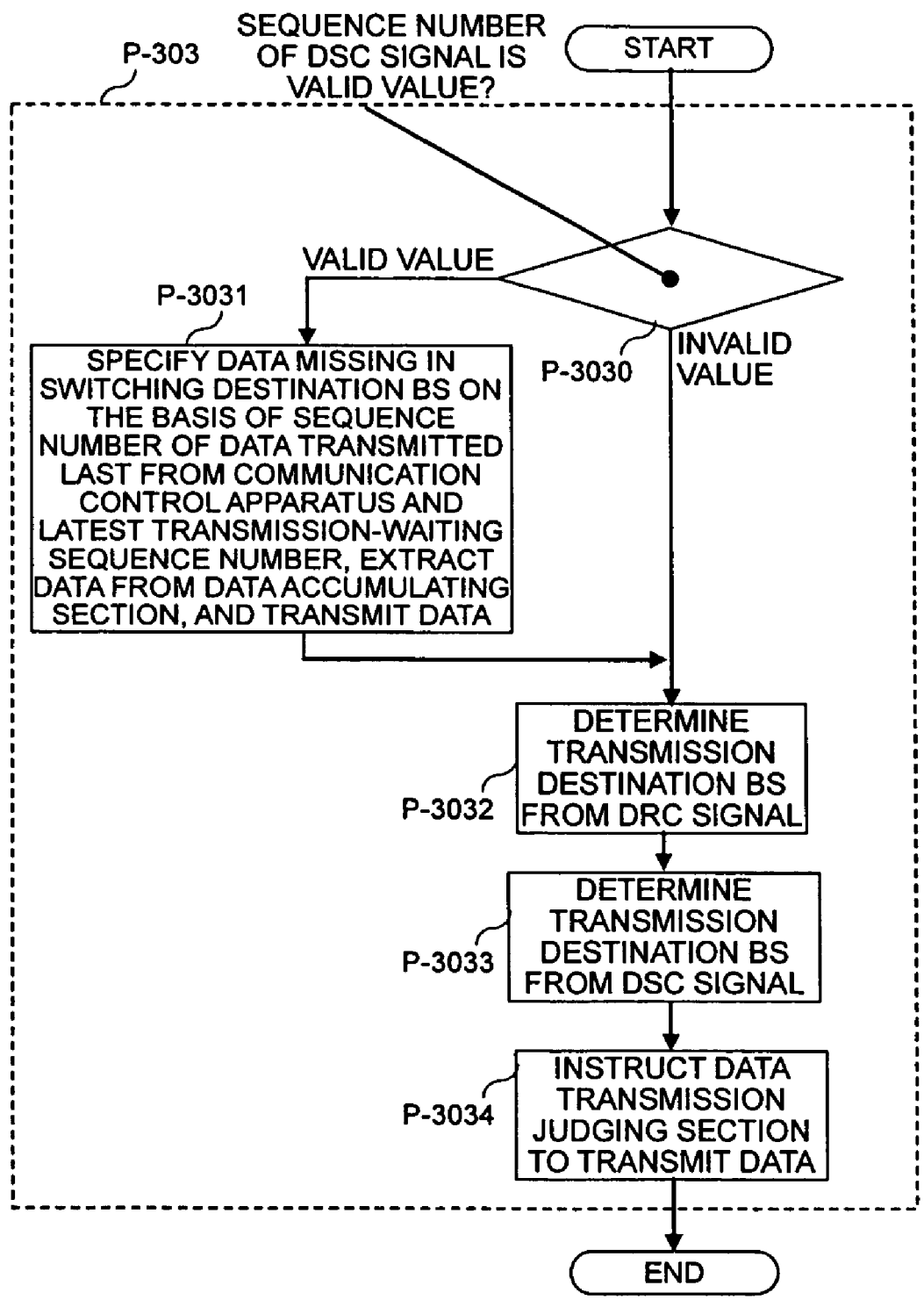
FIG. 20 is an operation flow diagram (3) showing an example of operations of the communication control apparatus.
Figure 21:
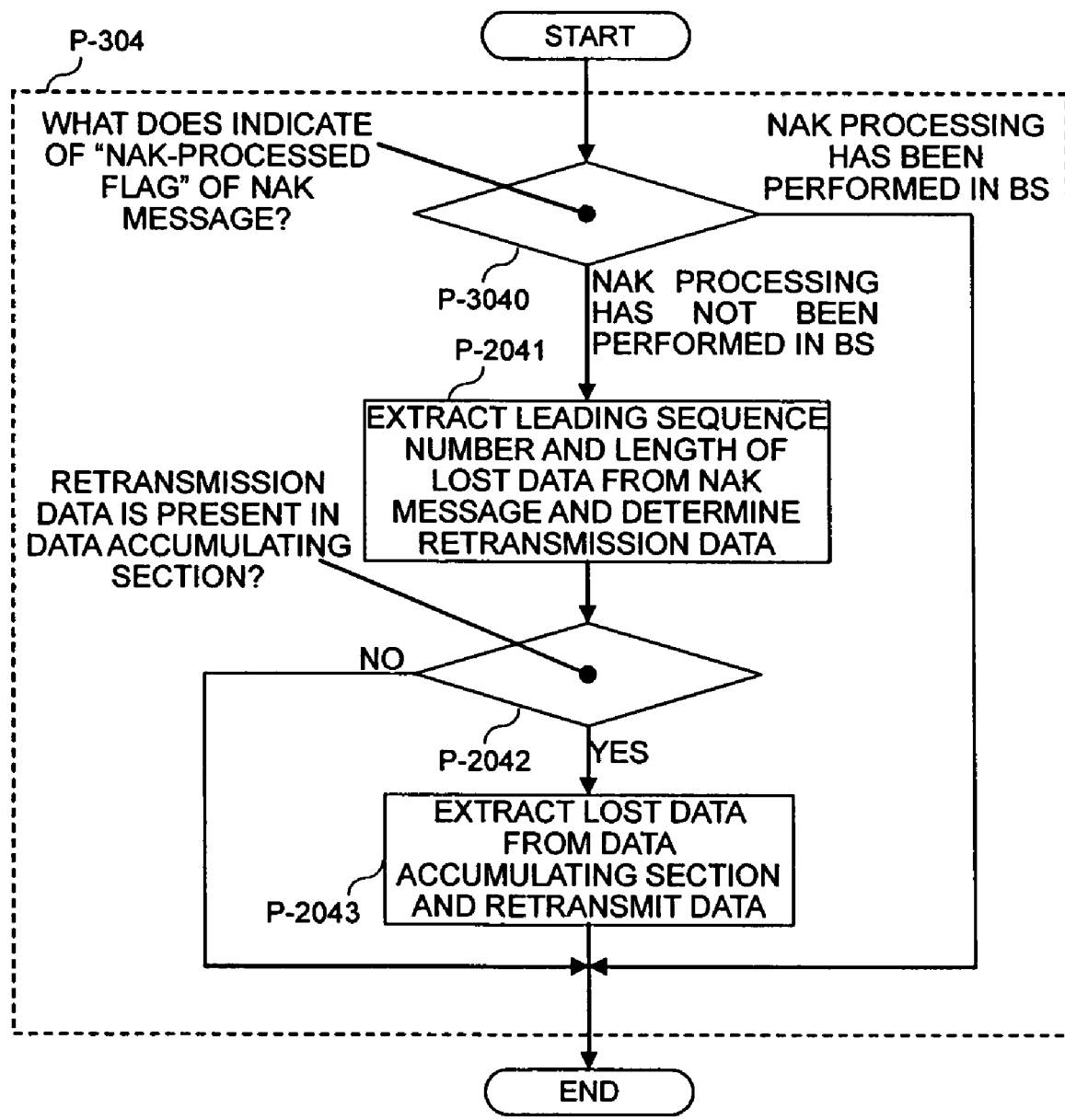
FIG. 21 is an operation flow diagram (4) showing an example of operations of the communication control apparatus.
Figure 22:
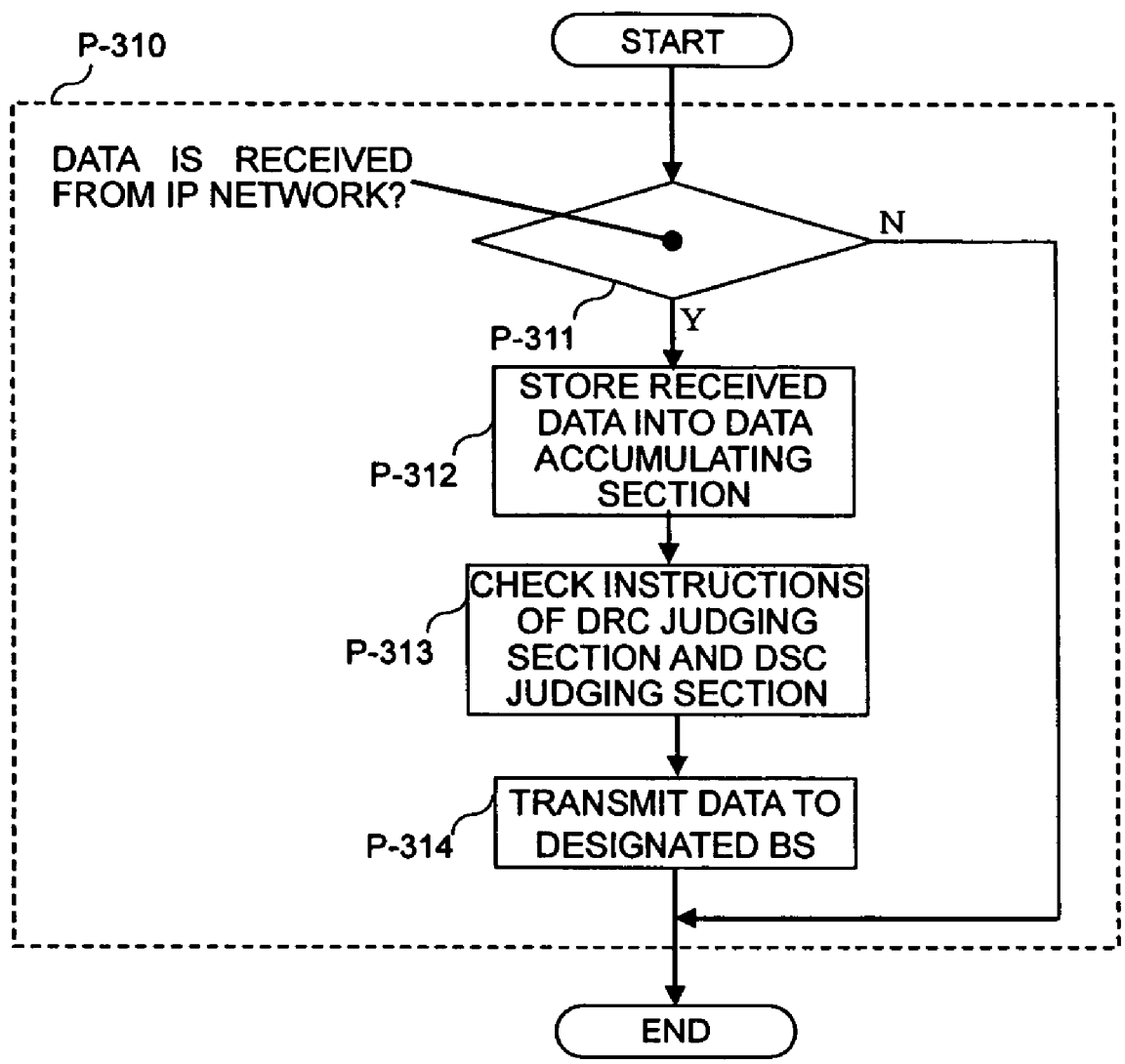
FIG. 22 is an operation flow diagram (5) showing an example of operations of the communication control apparatus.

FIGS. 18 to 22 are operation flow diagrams showing examples of operations of the communication control apparatus 300. FIG. 18 is an overview of an operation flow. The operation flow includes uplink data processing (P-300) for processing a flow of data and a message from the communication terminal apparatus 100 and the ISP 500 and downlink data processing (P-310) for processing a flow of data and a message from the ISP 500 to the communication terminal apparatus 100. For example, the uplink data processing and the downlink data processing are carried out in parallel. FIG. 19 is a detailed operation flow diagram of the uplink data processing (P-300). FIGS. 20 and 21 are operation flow diagrams in which a part (P-303 and P-304) of the uplink data processing (P-300) is described more in detail. FIG. 22 is a detailed operation flow diagram of the downlink data processing (P-310).

Figure 23:
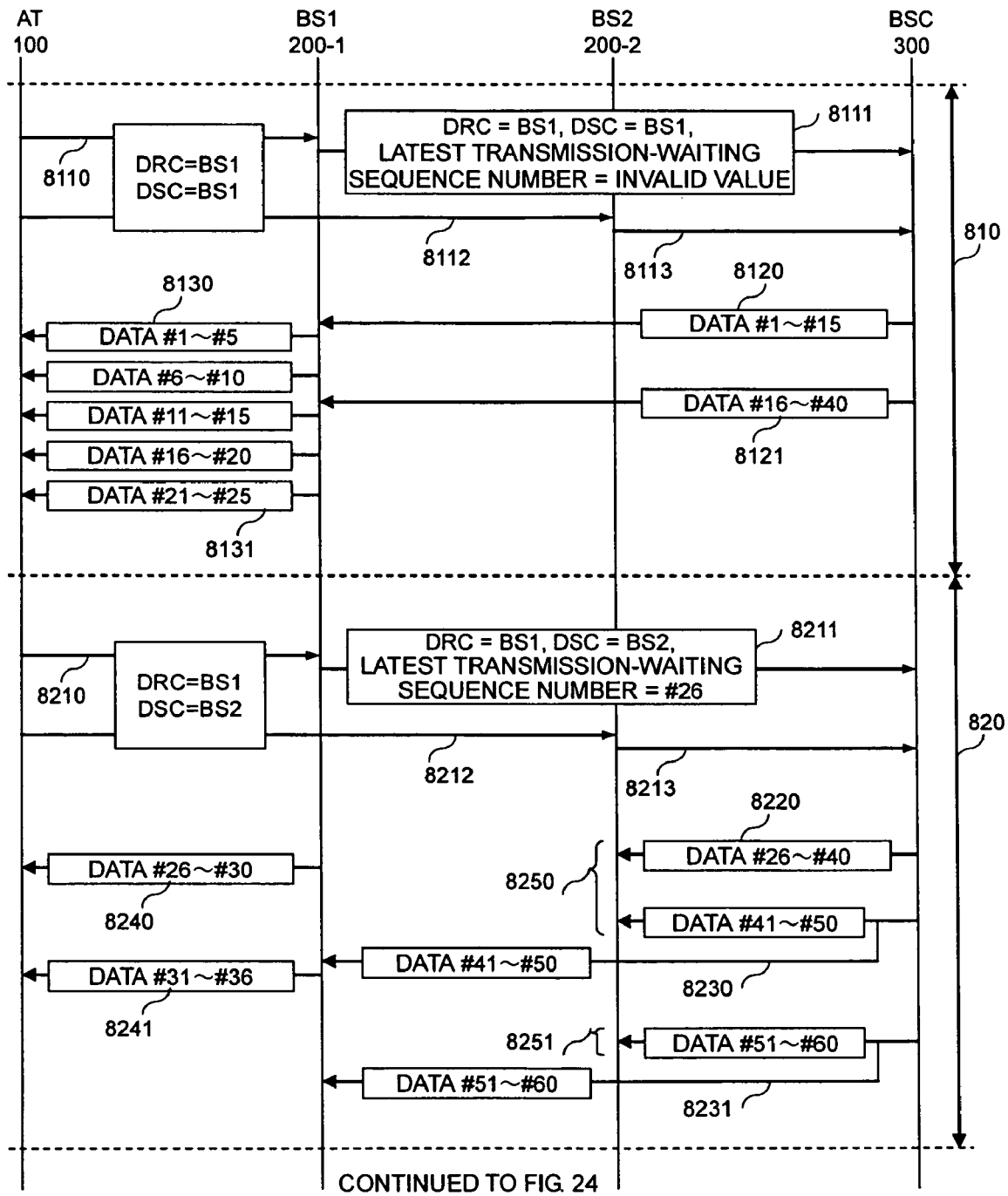
FIG. 23 is an operation sequence chart (1) for explaining an example of operations of the communication system.
Figure 24:
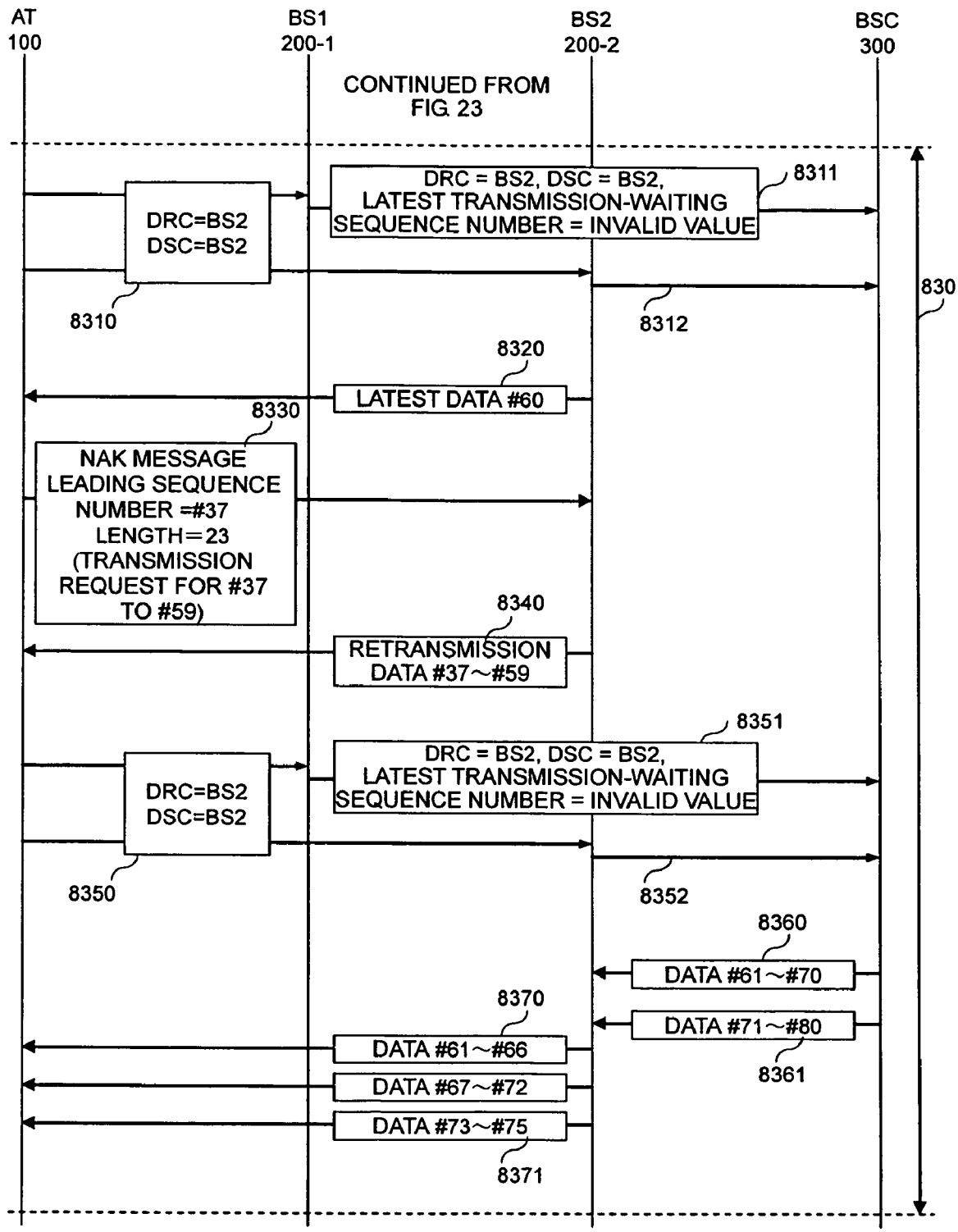
FIG. 24 is an operation sequence chart (2) for explaining an example of operations of the communication system.

FIGS. 23 and 24 are operation sequence diagrams for explaining operations of the communication system. The figures show signal transmission and reception and operations of the communication terminal apparatus 100, two communication connection apparatuses 200, and the communication control apparatus 300.

As exchange of data between the communication terminal apparatus 100 and the communication control apparatus 300, there are two kinds of flow of data, that is, a flow of data from the communication terminal apparatus 100 to the ISP 500 through the communication control apparatus 300 (hereinafter referred to as "uplink data transmission") and a flow of data from the ISP 500 to the communication terminal apparatus 100 through the communication control apparatus 300 (hereinafter referred to as "downlink data transmission"). Operations will be explained below concerning the downlink data transmission.

Moreover, concerning the downlink data transmission, three states, namely, a state in which the communication terminal apparatus 100-1 in the position (a) of the area 10-1 communicates with the communication connection apparatus (the first communication connection apparatus) 200-1 in FIG. 1, a state in which the communication terminal apparatus 100-2, which has moved to the position (b) in a boundary of the area 10-1 and the area 10-2, communicates with both the communication connection apparatuses 200-1 and 200-2, and a state in which the communication terminal apparatus 100-3, which has moved to the position (c) of the area 10-2, communicates with the communication connection apparatus (the second communication connection apparatus) 200-2, and processes of the states will be hereinafter explained.

First, an overview of processing will be explained with reference to FIGS. 23 and 24.

The first communication connection apparatus 200-1 receives a DRC signal including an identifier of the first communication connection apparatus 200-1 from the communication terminal 100 and transmits communication data from the communication control apparatus 300 to the communication terminal 100 in accordance with the DRC signal (a first data transmission step). The first communication connection apparatus 200-1 receives the DRC signal including the identifier of the first communication connection apparatus 200-1 and a DSC signal including an identifier of the second communication control apparatus 200-2, which are transmitted because the communication terminal 100 selects the second communication connection apparatus 200-2 with a communication destination set as a switching destination, and transmits a sequence number of data following the communication data transmitted in the first data transmission step and the DRC signal and the DSC signal received to the communication control apparatus 300. The first communication connection apparatus 200-1 transmits the communication data from the communication control apparatus 300 to the communication terminal 100 in accordance with the DRC signal (a second data transmission step).

The communication control apparatus 300 transmits communication data of the sequence number received from the first communication connection apparatus 200-1 and the subsequent sequence numbers to the second communication connection apparatus in accordance with the DSC signal. The second communication connection apparatus 200-2 accumulates the communication data of the sequence number and the subsequent sequence numbers from the communication control apparatus 300. The second communication connection apparatus 200-2 receives a DRC signal and a DSC signal including the identifier of the second communication connection apparatus 200-2 from the communication terminal 100 and transmits latest data or predetermined numbered data from the latest data among the communication data accumulated in the accumulating step to the communication terminal 100 (a third data transmission step).

The second communication connection apparatus 200-2 receives a retransmission request message including a leading sequence number of lost data for requesting lost data between the communication data, which the communication terminal 100 has received in the first and the second data transmission steps, and the data received in the third data transmission step from the communication terminal 100. The second communication connection apparatus 200-2 reads out communication data of the leading sequence number included in the retransmission request message received and the subsequent sequence numbers among the communication data accumulated in the accumulating step and transmits the communication data to the communication terminal 100 (a fourth data transmission step).

The processing will be explained in detail with reference to FIGS. 10 to 24.

First, an operation of the communication terminal apparatus 100-1 in the position (a) in FIG. 1 communicating with, for example, only the communication connection apparatus 200-1 (FIG. 23: 810) will be explained. It is assumed that the communication terminal apparatus 100-1 is in the position (a) for a sufficiently long time.

(1) The communication terminal apparatus 100 measures reception intensities of radio waves from the communication connection apparatuses 200 through the RF unit 120 and performs monitoring in the DRC creating section 1514 and the DSC creating section 1515 on the basis of the reception intensity (FIG. 11: P-101).

As reception intensity of radio waves received by the communication terminal apparatus 100-1 in the position (a), reception intensity of a radio wave received from the communication terminal apparatus 200-1 is higher than reception intensity of a radio wave received from the communication connection apparatus 200-2. Therefore, the communication connection apparatus 200-1 is determined as a BS, which should be set as a reception source, by the communication terminal apparatus 100-1 (FIG. 11: P-102). On the basis of this determination, the communication terminal apparatus 100 updates a DSC value (FIG. 11: P-103). The communication terminal apparatus 100 judges whether a predetermined time has elapsed from the last update of the DSC value (FIG. 11: P-105). It is possible to execute the processing in step P-103 and the processing in steps P-105 and P-106 in parallel. When it is assumed that the communication terminal apparatus 100-1 is in the position (a) for a sufficiently long time, the DSC value does not change. Thus, a result of the judgment (FIG. 11: P-105) is "Y: Yes" and update of a DRC value (FIG. 11: P-106) is carried out. As a result, both the DRC value and the DSC value take values indicating the communication connection apparatus 200-1 (BS1).

(2) On the basis of a result of (1), the communication terminal apparatus 100 transmits a DRC signal and a DSC signal to the communication connection apparatuses 200 through the data transmitting section 1516 and the radio processing section 1502 (FIG. 11: P-104 and P-107). The DRC signal and the DSC signal are transmitted to both the communication connection apparatuses 200-1 and 200-2 (FIG. 23: 8110 and 8112).

(3) When the data receiving section receives data via the radio processing section 2501 (FIG. 14: P-201), the communication connection apparatus 200-1 judges whether content of the data received is a DRC/DSC signal, a Nak message, or usual data (FIG. 14: P-202). Since the content of the data received is the DRC signal and the DSC signal, the communication connection apparatus 200-1 transfers the DRC signal and the DSC signal to the DRC/DSC judging section 2512. The DRC/DSC judging section 2512 determines, in DSC signal change judgment (FIG. 15: P-2030) and DRC signal change judgment (FIG. 15: P-2033), content that the DRC/DSC judging section 2512 should instruct the data transmission judging section 2517 to perform. The DSC signal change judgment refers to judgment on whether the DSC signal has changed from designation of another BS to designation of the own BS. The DRC signal change judgment refers to judgment on whether the DRC signal has changed from designation of another BS to designation of the own BS. For example, when it is assumed that the communication terminal apparatus 100-1 is in the position (a) for a sufficiently long time, it is judged in the DSC signal change judgment (FIG. 15: P-2030) that "the own BS is designated originally" and processing in step P-2032 is executed. In step P-2032, the communication connection apparatus 200-1 sets a latest transmission-waiting sequence number as an invalid value (FIG. 15: P-2032). Since it is judged in the DRC signal change judgment (FIG. 15: P-2033) that "the own BS is designated originally", the DRC/DSC judging section 2512 instructs the data transmission judging section 2517 "(B) to extract data following last transmission data from the data accumulating section and transmit the data" (FIG. 15: P-2035).

Figure 9A:
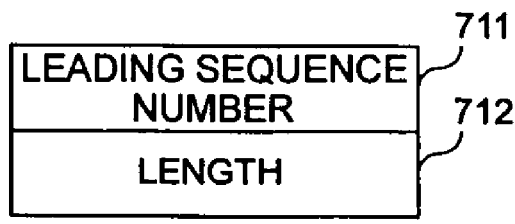
FIG. 9 is a frame diagram showing examples of structures of a Nak message and a DRC/DSC message transmitted and received among the communication terminal apparatus, the communication connection apparatus, and the communication control apparatus.
Figure 9B:
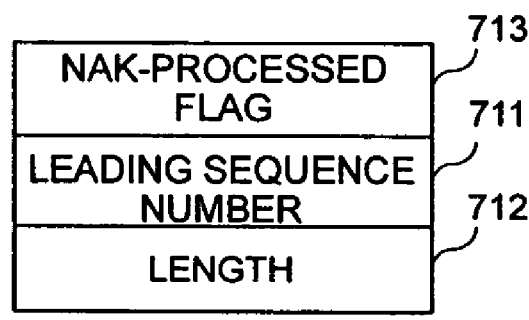
Figure 9C:
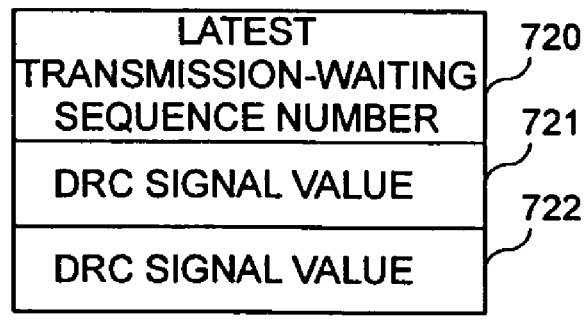

The DRC/DSC signal message (FIG. 9(c)) is created from the DRC signal and the DSC signal and transmitted to the communication control apparatus 300 in processing (FIG. 14: P-205) in the data receiving section 2511 (FIG. 23: 8111). The sequence number set as the invalid value is substituted in the "latest transmission-waiting sequence number" of the DRC/DSC signal message (FIG. 9(c)) on the basis of determination in the processing of (FIG. 15: P-2032).

(4) In the communication connection apparatus 200-2, the same processing as (3) is carried out. However, it is judged in the DSC signal change judgment (FIG. 15: P-2030) that "another BS is designated originally" and step P-2032 is executed. Since it is judged in the DRC signal change judgment (FIG. 15: P-2033) that "another BS is designated originally", the DRC/DSC judging section 2512 instructs the data transmission judging section 2517 "(C) not to transmit data" in P-2036 in FIG. 15.

Transfer of the DRC signal and the DSC signal to the communication control apparatus 300 is carried out as in (3) (FIG. 23: 8113). The sequence number set as the invalid value is substituted in the "latest transmission-waiting sequence number" of the DRC/DSC signal message (FIG. 9(c)) (FIG. 15: P-2032).

(5) In the uplink data processing (P-300), the communication control apparatus 300 judges content of data received through the data receiving section 3411 (FIG. 19: P-301 and P-302). Since the content is a DRC/DSC signal message, the communication control apparatus 300 transfers the DRC/DSC signal message to the DRC/DSC judging section 3412. The DRC/DSC judging section 3412 judges the "latest transmission-waiting sequence number" of the DRC/DSC signal message (FIG. 9(c)) (FIG. 20: P-3030). Since the invalid value is set in the "latest transmission-waiting sequence number" by the processing in (3) and (4), (FIG. 20: P-3032) is executed. Both the DRC signal and the DSC signal have content indicating the communication connection apparatus 200-1. Therefore, the communication connection apparatus 200-1 is determined as a transmission destination (FIG. 20: P-3032 and P-3033). In step P-3034 in FIG. 20, the communication control apparatus 300 instructs the data transmission judging section 3417 to transmit data to the communication connection apparatus 200-1.

(6) In the downlink data processing (P-310), the communication control apparatus 300 receives data from the ISP 500 in the IP network transmission/reception section 3401 through the IP network 400 (FIG. 22: P-310). The IP network transmission/reception section 3401 transfers the data received to the data transmission judging section 3417.

The data transmission judging section 3417 stores the data in the data accumulating section 3415 (FIG. 22: P-312). The data transmission judging section 3417 determines the communication connection apparatus 200 at a communication destination (FIG. 22: P-313) in accordance with an instruction based on a result of the judgment in (5), reads out the data from the data accumulating section 3415, and transmits the data to the communication connection apparatus 200 determined via the data transmitting section 3418 (FIG. 22: P-314). For example, the data transmission judging section 3417 transmits data #1 to #15 and data #16 to #40. Since the DRC signal and the DSC signal generated in (1) designate the same communication connection apparatus 200-1, judging from the result in (5), only the communication connection apparatus 200-1 is an object of data transmission (FIG. 23: 8120 and 8121).

(7) The communication connection apparatus 200-1 receives data (first communication data) in the IP network transmission/reception section 2502 from the communication control apparatus 300 (FIG. 17: P-211). The IP network transmission/reception section 2502 transfers the data to the data transmission judging section 2517.

The data transmission judging section 2517 stores the data in the data accumulating section 2515 (FIG. 17: P-212) and determines a method of transmitting data to the communication terminal apparatus 100 on the basis of the result of judgment and the instruction in (3) (FIG. 17: P-213 and P-214). Since the DRC signal created in (1) designates the communication connection apparatus 200-1, the data transmission judging section 2517 extracts data from the data accumulating section 2515 such that sequence numbers are continuous and transmits the data to the communication terminal apparatus 100-1 (FIG. 17: P-215, FIG. 23: 8130 and 8131). A transfer rate of the data transmission to the communication terminal apparatus 100-1 changes according to a state of a radio section. The data is divided into, for example, data #1 to #5 and data #6 to #10 and transmitted for a radio signal. As the data to be transmitted, for example, in accordance with a format in FIG. 8, the data #1 to #5 are included in the data body 013 and data #1 is included in the leading sequence number 611. Thus, timing of data reception from the communication control apparatus 300 (FIG. 23: 8120 and 8121) and timing of data transmission to the communication terminal apparatus 100-1 (FIG. 23: 8130 and 8131) do not always coincide with each other. It is assumed that data up to data #25 are transmitted to the communication terminal apparatus 100-1.

(8) The communication terminal apparatus 100-1 receives the data from the communication connection apparatus 200-1 in the radio processing section 1502 (FIG. 12: P-111). The radio processing section 1502 transfers the data to the sequence number judging section 1512 through the data receiving section 1511. The sequence number judging section 1512 checks a sequence number (FIG. 8: 611) granted to a header of the data (FIG. 12: P-112). In the processing in (7), since the data with the continuous sequence numbers are transmitted from the communication connection apparatus 200-1, for example, it is judged that there is no loss unless data is lost in the radio section (P-113: N) and the data is transferred to the application processing section 1501 (FIG. 12: P-115). For example, the processing in step P-115 may be performed after a data group with continuous sequence numbers is formed (FIG. 12: P-114). The application processing section 1501 performs appropriate application processing on the basis of the data received.

Operations in the case in which the communication terminal apparatus 100 moves from the position (a) to the position (b) in FIG. 1 will be explained. In this state, the communication terminal apparatus 100-2 performs communication with both the communication connection apparatuses 200-1 and 200-2.

(9) When the communication terminal apparatus 100 moves from the position (a) to the position (b), as reception intensity of a radio wave of the communication terminal apparatus 100-2, a radio wave received from the communication connection apparatus 200-1 weakens and a radio wave received from the communication connection apparatus 200-2 strengthens. Thus, reception intensities of the radio waves are reversed. When the communication terminal apparatus 100 detects this reversal of the intensities (FIG. 11: P-102), a communication connection apparatus indicated by the DSC value is updated from the BS 200-1 to the BS 200-2 (FIG. 11: P-103). On the other hand, concerning the DRC value, since a result of the judgment in step P-105 in FIG. 11 is "N" immediately after changing a DSC value, the DRC value is not updated and keeps the value in (1). The DSC value continues to indicate the communication connection apparatus 200-1. Thus, the DRC value indicates the communication control apparatus 200-1 (BS 1) and the DSC value indicates the communication control apparatus 200-2 (BS 2).

(10) As in (2), a result of (9) is transmitted from the communication terminal apparatus 100-2 to the communication connection apparatuses 200-1 and 200-2 (FIG. 11: P-107 and P-108, FIG. 23: 8210 and 8212).

(11) In the communication connection apparatus 200-1, as in (3) above, it is determined, in DSC signal change judgment (FIG. 15: P-2030) and DRC signal change judgment (FIG.

15: P-2033) of the DRC/DSC judging section 2512, content that the communication connection apparatus 200-1 should instruct the data transmission judging section 2517 to perform. Since the indication of the DSC value has changed from the own BS to another BS, it is judged in the DRC signal change judgment (FIG. 15: P-2030) that "designation is changed to another BS" and the communication connection apparatus 200-1 executes processing in step P-2031. In step P-2031, the communication connection apparatus 200-1 sets a latest transmission-waiting sequence number as a leading sequence number waiting for transmission (FIG. 15: P-2031). The leading sequence number waiting for transmission is a sequence number (#26) following the data (#1 to #25) transmitted to the communication terminal apparatus 100. Since it is judged in the DRC signal change judgment (FIG. 15: P-2033) that "the own BS is designated originally", the DRC/DSC judging section 2512 instructs the data transmission judging section 2517 "(B) to extract data following last transmission data from the data accumulating section and transmit the data" in (FIG. 15: P-2035).

Creation of the DRC/DSC signal message (FIG. 9(c) is carried out as in (3). However, concerning the "latest transmission-waiting sequence number" of the DRC/DSC signal message (FIG. 9(c)), a leading sequence number (e.g., #26) of data waiting transmission to the communication terminal apparatus 100 is substituted in the "latest transmission-waiting sequence number" in the communication connection apparatus 200-1 on the basis of the determination in the processing in (FIG. 15: P-2031) and transmitted to the communication control apparatus 300 (FIG. 23: 8211).

(12) In the communication connection apparatus 200-2, since the indication of the DSC value has changed from another BS to the own BS, it is judged in the DSC signal change judgment (FIG. 15: P-2030) that "designation is changed to the own BS" and the processing in step P-2032 is executed. Details of the processing are the same as the above description. Since it is judged in the DRC signal change judgment (FIG. 15: P-2033) that "another BS is designated originally", the DRC/DSC judging section 2512 instructs the data transmission judging section 2517 "(C) not to transmit data" in (FIG. 15: P-2036).

Transfer of the DRC signal and the DSC signal to the communication control apparatus 300 is also carried out as in (4) (FIG. 23: 8213). The sequence number set as the invalid value is substituted in the "latest transmission-waiting sequence number" of the DRC/DSC signal message (FIG. 9(c)).

(13) The DRC/DSC signal message including the DRC signal and the DSC signal is transferred to the DRC/DSC judging section 3412, in the same operation as (5), the communication control apparatus 300 judges the "latest transmission-waiting sequence number" of the DRC/DSC signal message (FIG. 9(c)) (FIG. 20: P-3030). Since a valid value (#26) is set in the "latest transmission-waiting sequence number" by the processing in (9) and (11), processing in (FIG. 20: P-3031) is executed. In step P-3031, the communication control apparatus 300 calculates data lost in the communication connection apparatus 200-2 at the connection destination on the basis of the "latest transmission-waiting sequence number" of the DRC/DSC signal message (FIG. 9(c)) and a sequence number of data that the communication control apparatus 300 transmitted last. In an example in FIG. 23, the "latest transmission-waiting sequence number" is #26 and the sequence number of data that the communication control apparatus 300 transmitted last is #40. Thus, the data lost in the communication connection apparatus 200-2 are data with the sequence numbers #26 to #40. The communication control apparatus 300 reads out the data from the data accumulating section and transmits the data to the communication connection apparatus 200-2 (FIG. 23: 8220). According to this processing, preparation for transmitting the data to the communication terminal apparatus 100 without causing loss of the data is made on the data accumulating section 2515 of the communication connection apparatus 200-2.

Subsequently, the communication control apparatus 300 determines a transmission destination BS (FIG. 20: P-3032 and P-3033). As a result of the processing in (9), the DRC signal indicates the communication connection apparatus 200-1 and the DSC signal indicates the communication connection apparatus 200-2. Thus, the DRC/DSC judging section instructs the data transmission judging section 3417 to transmit the data to both the communication connection apparatuses 200-1 and 200-2.

(14) In the downlink data processing, in the same operation as (6), the communication control apparatus 300 transfers data from the ISP 500 to the communication connection apparatus 200. According to the determination and the instruction of the DRC/DSC judging section (FIG. 20: P-3034) in (13), the data is transmitted to both the communication connection apparatuses 200-1 and 200-2 in the processing in the data transmission judging section 3417 (FIG. 22: P-313 and P314, FIG. 23: 8230 and 8231).

(15) In the data transmission judging section 2517 of the communication connection apparatus 200-1, the data is transmitted to the communication terminal apparatus 100-2 (FIG. 23: 8240 and 8241) in (FIG. 17: P-213, (B) in P-214, and P-215) on the basis of a result of the judgment of the DRC/DSC judging section 3412 in (11) (FIG. 15: P-2035). It is assumed that, as an example, data #26 to #36 are transmitted.

(16) In the data transmission judging section 2517 of the communication connection apparatus 200-2, data transmission to the communication terminal apparatus 100-2 is not carried out on the basis of a result of the judgment of the DRC/DSC judging section 2512 in (12) (FIG. 15: P-2035) (FIG. 17: P-213 and (C) in P-214). The data are accumulated in the data accumulating section 2515 (FIG. 23: 8250 and 8251).

(17) The communication terminal apparatus 100-2 transmits the data received from the communication connection apparatus 200-1 to the application processing section 1501 as in (8). The data is transmitted to the application processing section 1501 unless there is no loss in the radio section.

Operations in the case in which the communication terminal apparatus 100 moves from the position (b) to the position (c) in FIG. 1 will be explained. In this state, for example, the communication terminal apparatus 100-3 performs communication with only the communication connection apparatus 200-2 (FIG. 23: 830).

(18) When a fixed time elapses after the DSC signal switching of the communication terminal apparatus 100 in (9) described above is performed by the communication terminal apparatus 100, a result of the judgment in the DRC creating section 1514 in the communication terminal apparatus 100 (FIG. 11: P-105) is "Y" and update of the DRC value is performed (FIG. 11: P-106). In this update, the DRC value is set to a value indicating the communication connection apparatus 200-2 on the basis of a result of the judgment of radio wave intensity in (FIG. 11: P-101). As a result, in the communication terminal apparatus 100-3, both the DRC signal and the DSC signal indicate the communication connection apparatus 200-2 (BS 2). Both the signals are transmitted to the communication connection apparatuses 200-1 and 200-2 (FIG. 24: 8310).

(19) In the communication connection apparatus 200-1, as in the (3) and (11) described above, content that the communication connection apparatus 200-1 should instruct the data transmission judging section 2517 to perform is determined in the DSC signal change judgment (FIG. 15: P-2030) and the DRC signal change judgment (FIG. 15: P-2033) of the DRC/DSC judging section 2512. The indication of the DRC value has changed from the own BS to another BS, it is judged in the DSC signal change judgment (FIG. 15: P-2030) that "another BS is designated originally", and step P-2032 is executed. Since it is judged in the DRC signal change judgment (FIG. 15: P-2033) that "designation is changed to another BS", the DRC/DSC judging section 2512 instructs the data transmission judging section 2517 "(C) not to transmit data" in (FIG. 15: P-2036).

Creation of the DRC/DSC signal message (FIG. 9(c)) is also carried out as in. (3) and (11). The sequence number set as the invalid value is substituted in the "latest transmission-waiting sequence number" of the DRC/DSC signal message (FIG. 9(c)) in accordance with the processing P-2032 described above (FIG. 24: 8311).

(20) In the communication connection apparatus 200-2, as in (4) and (12), content that the communication connection apparatus 200-2 should instruct the data transmission judging section 2517 to perform is determined in the DSC signal change judgment (FIG. 15: P-2030) and the DRC signal change judgment (FIG. 15: P-2033) of the DRC/DSC judging section 2512. The indication of the DRC value has changed from another BS to the own BS, it is judged in the DSC signal change judgment (FIG. 15: P-2030) that "the own BS is designated originally", and step P-2032 is executed. Since it is judged in the DRC signal change judgment (FIG. 15: P-2033) that "designation is changed to the own BS", the DRC/DSC judging section 2512 instructs the data transmission judging section 2517 "(A) to extract latest received data from the data accumulating section and transmit the data" in (FIG. 15: P-2034).

Creation of the DRC/DSC signal message (FIG. 9(c)) is also carried out as in (4) and (12). The sequence number set as the invalid value is substituted in the "latest transmission-waiting sequence number" of the DRC/DSC signal message (FIG. 9(c)) (FIG. 24: 8312).

(21) In the communication connection apparatus 200-2, in the data transmission judging section 2517, it is judged "(A) to extract latest received data from the data accumulating section and transmit the data" in accordance with the determination in (20) (FIG. 17: P-214). As a result, in processing (FIG. 17: P-216), the data transmission judging section 2517 extracts latest data from the data accumulating section 2515 and transmits the data to the communication terminal apparatus via the data transmitting section 2518 (FIG. 24: 8320). In an example in FIG. 24, since data with a sequence number #60 received in 8231 in FIG. 23 corresponds to the latest data, the data transmission judging section 2517 transmits the data of #60 to the communication terminal apparatus 100 in 8320 in FIG. 24. Other than transmitting the latest data, the data transmission judging section 2517 may transmit data older than the latest data, for example, appropriate data such as predetermined numbered data from the latest data.

According to this processing, viewed from the communication terminal apparatus 100, since the data of #36 received last from the communication connection apparatus 200-1 (FIG. 23: 8241) and the data of #60 (FIG. 24: 8320) are received, it looks as if the data is lost in the middle of reception.

(22) When the communication terminal apparatus 100-3 receives the data with the sequence number #60, which the communication control apparatus 200-2 transmitted in (21), in the data receiving section 1511, check of the sequence number (FIG. 12: P-112) is carried out in the sequence number judging section 1512. In the examples in FIGS. 23 and 24, since the sequence number of the data received by the communication terminal apparatus 100-3 last time (FIG. 23: 8241) is #36, a loss is detected between the data and the data of #60 received this time (FIG. 12: P-113, Y). Consequently, the Nak message creating section 1513 creates a Nak message (FIG. 12: P-116) and transmits the Nak message to the communication connection apparatus 200-2 via the data transmitting section 1516 (FIG. 12: P-117, FIG. 24: 8330). #37, which is a head of lost data, is described in the sequence number (FIG. 9(a): 711) of the Nak message (FIG. 9(a)). 23, which is length of the lost data (length from #37 to #59), is described in the Length (FIG. 9(a): 712).

(23) In the communication connection apparatus 200-2, when the data receiving section 2511 receives the Nak message (FIG. 9(a)) of (22) (FIG. 14: P-201 and P-202), in the Nak message analyzing section 2514, analysis of the Nak message is carried out (FIG. 14: P204). The Nak message analyzing section 2514 finds from content of the Nak message (the leading sequence number of the lost data and the Length) that the lost data is #37 to #59 (FIG. 16: P-2040). The Nak message analyzing section 2514 judges whether these data are present in the data accumulating section 2515 (FIG. 16: P-2041). The data transmitted from the communication control apparatus 300 to the communication connection apparatus 200-2 in advance in (13) described above (FIG. 23: 8220) correspond to the lost data #37 to #40. The data transmitted to both the communication connection apparatuses 200-1 and 200-2 (FIG. 24: 8230 and 8231) correspond to the remaining lost data #41 to #59. By carrying out the processing in (13) described above, it is possible to prevent a situation in which data for retransmission is not present in the communication connection apparatus 200-2. By carrying out the retransmission processing for data in the communication connection apparatus 200 rather than in the communication control apparatus 300, there is an effect that an arrival delay time of retransmission data is reduced.

Since all data for retransmission are present in the data accumulating section 2515, pertinent data is extracted from the data accumulating section 2515 and retransmission data is transmitted to the communication terminal apparatus 100-3 (FIG. 16: P-2042, FIG. 24: 8340).

Moreover, in order to transmit a Nak message to the communication control apparatus 300, step P-2043 in FIG. 16 is carried out. To prevent retransmission from being performed again in the communication control apparatus 300, the Nak-processed flag (FIG. 9(b): 713) of the Nak message (FIG. 9(b)) is set to notify that the retransmission processing has been carried out in the communication connection apparatus.

When data for retransmission is not present in the data accumulating section 2515, a result of the judgment in P-2041 in FIG. 16 is "No" and step P-2044 is executed. In P-2044 in FIG. 16, a message is transmitted to the communication control apparatus without setting the Nak-processed flag (FIG. 9(b): 713) of the Nak message (FIG. 9(b)) such that retransmission is carried out in the communication control apparatus 300 (P-2044).

(24) The communication terminal apparatus 100-3 receives the retransmission data, which is transmitted by the communication connection apparatus 200-2 in (23), in the data receiving section 1511. The retransmission data is transferred to the sequence number judging section 1512 and check of a sequence number is performed (FIG. 12: P-112). The loss of the data #37 to #59 detected in (22) form continuous data with the arriving retransmission data (P-113, N). The data with the continuous sequence numbers are transferred to the application processing section 1501 (FIG. 12: P-114 and P-115). The application processing section 1501 performs application processing on the basis of the data received.

A DRC signal and a DSC signal may be transmitted from the communication terminal apparatus 100 anew (FIG. 24, 8350 to 8352). Processing applied to these signals is the same as the processing 8310 to 8312 described above. When indication of the DRC signal changes from another apparatus to the own apparatus in a state in which the DSC signal indicates the own apparatus as described above, the communication connection apparatus 200-2 executes the processing 8320, but the communication connection apparatus 200-2 does not execute the processing 8320 unless the DRC signal changes.

(25) The communication control apparatus 300 transfers a DRC/DSC signal message to the DRC/DSC judging section 3412 in the same operation as (13) and judges the "latest transmission-waiting sequence number" of the DRC/DSC signal message (FIG. 9(c)) (FIG. 20: P-3030). According to the processing in (18) and (19), since the invalid value is set in the "latest transmission-waiting sequence number", (FIG. 20: P-3032) is executed. Both the DRC signal and the DSC signal have content indicating the communication connection apparatus 200-2 (BS 2). Therefore, the communication connection apparatus 200-2 is determined as a transmission destination (FIG. 20: P-3032 and P-3033). The communication control apparatus 300 instructs the data transmission judging section 3417 to transmit data to the communication connection apparatus 200-2 (FIG. 20: P-3034).

(26) In the downlink processing, the communication control apparatus 300 transmits data from the ISP 500 to the communication terminal apparatus 100 as in (6). The data transmission judging section 3417 stores the data received in the data accumulating section 3415 (FIG. 22: P-311 and P-312), determines the communication connection apparatus 200 at a destination on the basis of the instruction of the result of the judgment in (25) (FIG. 22: P-313), and transmits the data to the communication connection apparatus 200 (FIG. 22: P-314, FIG. 24: 8360 and 8361). Since the DRC signal and the DSC signal generated in (18) designates the same communication connection apparatus 200-2, only the communication connection apparatus 200-2 is an object of the data transmission judging from the result of (25). Thereafter, that state continues. The communication connection apparatus 200-2 transmits the data to the communication terminal apparatus 100 (FIG. 24: 8370 and 8371).

(27) The Nak message (FIG. 9(b)) transmitted in the Nak message transmission processing (FIG. 16: P-2043 or P-2044) of the communication connection apparatus 200 in (23) is received by the communication control apparatus 300. When there is received data (FIG. 19: P-301), the communication control apparatus 300 judges content of the data (FIG. 19: P-302). When it is judged that the content is a Nak message, Nak message processing (FIG. 19: P-304) is executed. In the Nak message processing (FIG. 19: P-304), the communication control apparatus 300 evaluates the Nak-processed flag (FIG. 9(b): 713) of the Nak message (FIG. 9(b)) (FIG. 21: P-3040).

When Nak message transmission processing including the retransmission processing shown in steps P-2042 and P-2043 in FIG. 16 is carried out by the communication connection apparatus 200 and the Nak-processed flag (FIG. 9(b): 713) is set, the communication control apparatus 300 judges that the retransmission processing is unnecessary and performs no processing.

On the other hand, when Nak message transmission processing not including the retransmission processing shown in step P-2044 in FIG. 16 is carried out by the communication connection apparatus 200 and the Nak-processed flag (FIG. 9(b): 713) is not set, the communication control apparatus 300 judges that the retransmission processing is necessary and carries out the retransmission processing in step P-2041 and the subsequent steps. For example, in the Nak message analyzing section 3414, analysis of the Nak message is carried out to specify data that should be retransmitted on the basis of a sequence number and Length (FIG. 21: P-2041). The data retransmitting section 3416 extracts data from the data accumulating section 3415 and transmits the data to the data transmitting section 3418 (FIG. 21: P-2043). When data is not present in the data accumulating section 3415, the communication control apparatus 300 does not carry out retransmission.

The processing in which the communication terminal apparatus 100 switches a communication destination from the communication connection apparatus 200-1 to the communication connection apparatus 200-2 is completed in the operations described above. In the above explanation, the communication terminal apparatus 100 moves to be subjected to Handoff. Besides, the invention is also applicable to a case in which the communication terminal apparatus 100 is subjected to Handoff because of a change in a radio wave environment due to movement of an obstacle or the like or a change in a communication environment such as a congestion condition of communication.

As described above, the communication connection apparatus 200-2 detects a change of a DRC signal from another BS to the own BS and transmits latest data among data accumulated to the communication terminal apparatus 100 to induce a Nak message, which is a request for retransmission from the communication terminal apparatus 100. Since the communication connection apparatus 200-2 retransmits the data on the basis of a sequence number described in this Nak message, there is an advantage that the communication connection apparatus 200-2 does not need to learn in advance to which extent the communication terminal apparatus 100 has received the data.

The detection of data loss and the transmission of a Nak message in the communication terminal apparatus 100 are the same as operations in the case in which data is lost in the radio section in the usual communication state. These are functions provided in the existing communication terminal apparatus 100. Thus, there is an advantage that the invention does not require a special mechanism in the communication terminal apparatus 100.

Moreover, the retransmission processing for data by a Nak message is carried out in the communication connection apparatus 200 closer to the communication terminal apparatus 100 rather than in the communication control apparatus 300 to reduce time required for the retransmission processing.

In order to prevent a state in which no retransmission data is present in the communication connection apparatus 200 at the time of retransmission, a change from the own BS to another BS of a DSC signal is detected and lost data is transmitted from the communication control apparatus 300 to the communication connection apparatus 200 to accumulate data necessary for retransmission.

Consequently, in the invention, in a period from the start till the end of switching of a communication destination, no redundancy or loss occurs in data that passes the radio section. Thus, there is an effect that a fall of efficiency of use of the radio section due to appearance of a no-communication period or transmission of redundant data is prevented.

Figure 25:
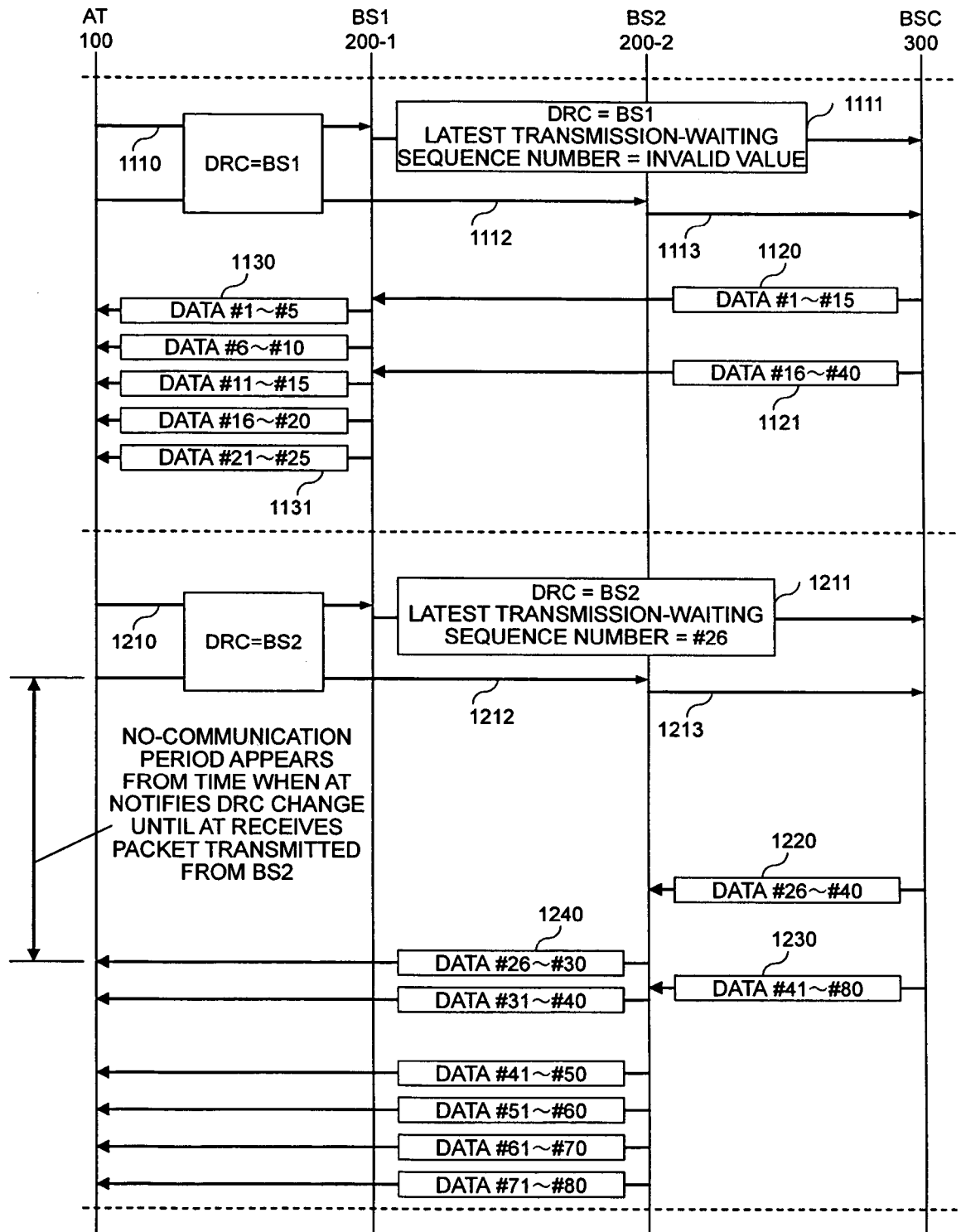
FIG. 25 is a diagram showing an example of communication switching by a DRC signal.

FIG. 25 is an example of communication switching by a DRC signal. An example of operations in the case in which a DSC signal is not used will be explained with reference to FIG. 25. FIG. 25 and the following explanation are described according to the explanation of this embodiment to facilitate understanding and do not specify a conventional technique.

In processing 910, for example, when the AT 100 is close to the BS 200-1, communication data is transmitted to the AT 100 via the BS 200-1 in accordance with the DRC signal (processing 1110 to processing 1131).

For example, when the AT 100 moves, the AT 100 switches DRC to the BS 2 according to a change in received radio wave intensity and transmits the data to the BS 1 and the BS 2 (processing 1210 and 1212). The BS 1 transmits the DRC and a latest transmission-waiting sequence number (as an example, #26) to the BSC (processing 1211). The BS 2 transmits the DRC and an invalid value set as the latest transmission-waiting sequence number to the BSC (processing 1213). The BSC changes a BS to be a transmission destination of the data to the BS 2. The data are transmitted to the AT via the BS 2 (processing 1220 to 1240). In this example, as shown in the figure, a no-communication period appears from the time when the AT notifies the DRC change until the time when the AT receives a transmission packet from the BS 2.

On the other hand, according to this embodiment, it is possible to transmit data from the BS 1 before data from the BSC arrives at the BS 2. Thus, it is possible to reduce this no-communication section.

Figure 26:
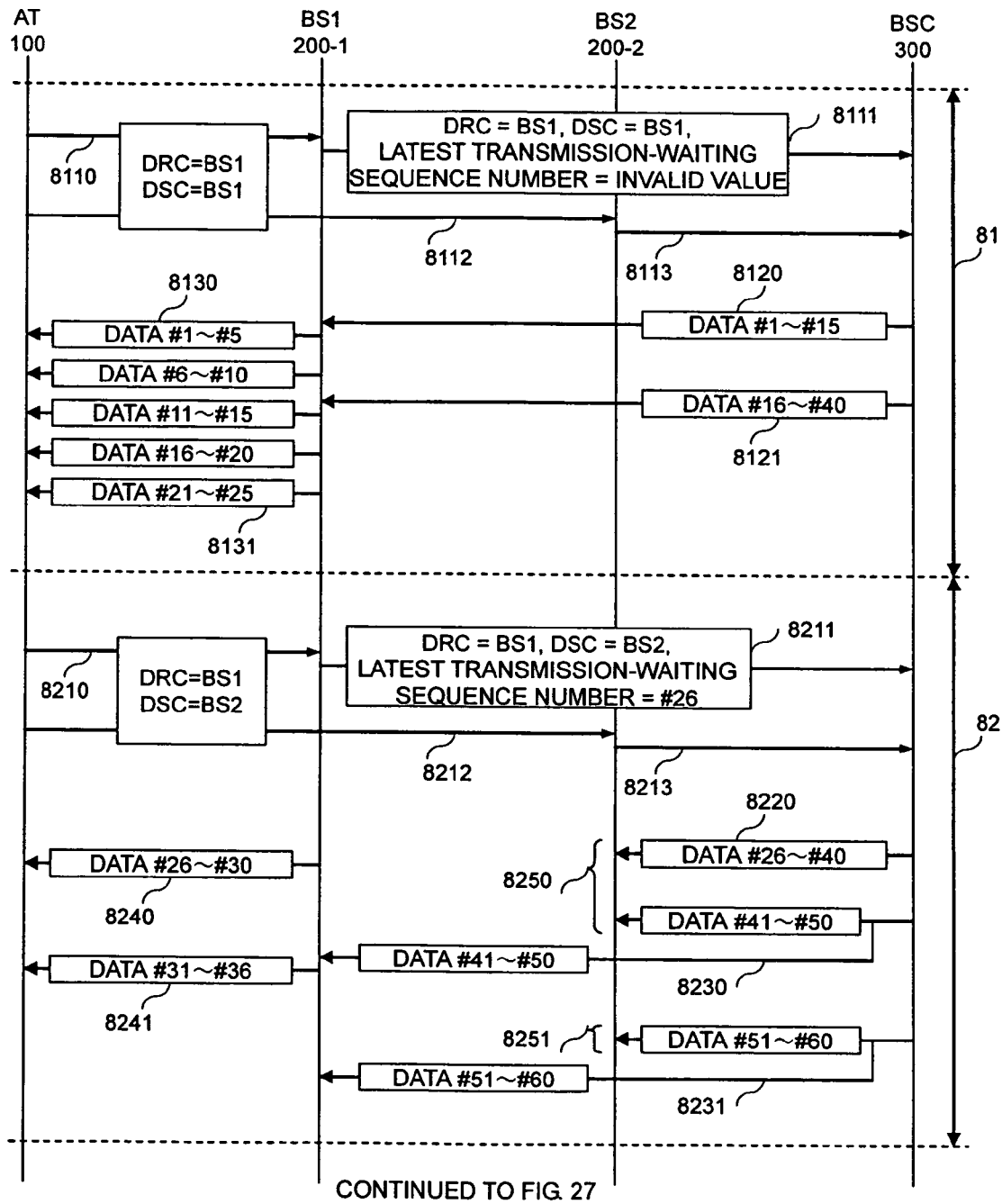
FIG. 26 is a diagram (1) showing an example of communication switching by a DRC signal and a DSC signal.
Figure 27:
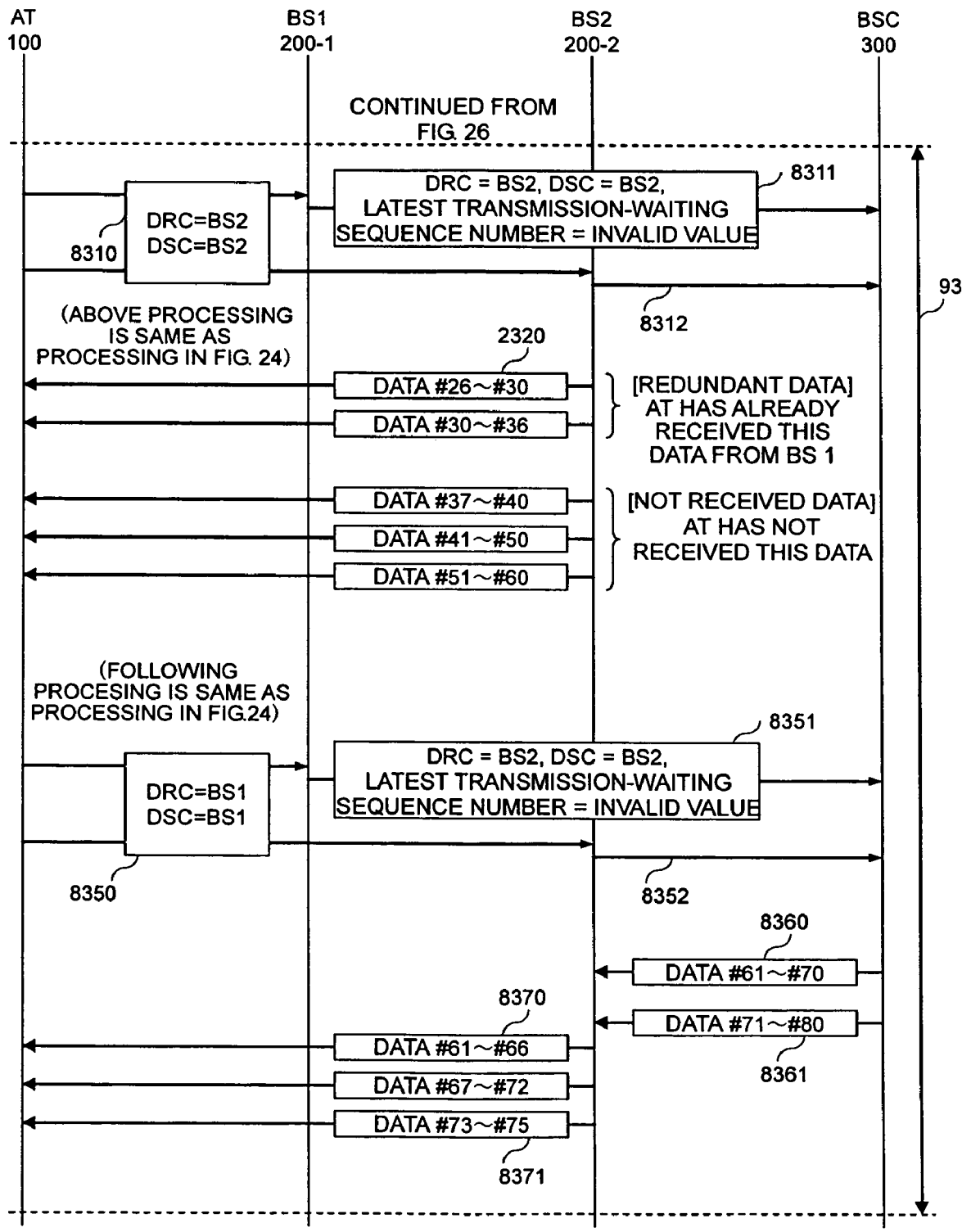
FIG. 27 is a diagram (2) showing an example of communication switching by a DRC signal and a DSC signal.

FIGS. 26 and 27 are an example of communication switching by a DRC signal and a DSC signal. An example of operations in the case in which latest data is not transmitted from the BS 2 and a Nak message is not induced will be explained with reference to FIGS. 26 and 27. FIGS. 26 and 27 and the following explanation are described according to the explanation of this embodiment to facilitate understanding and do not specify a conventional technique.

Respective kinds of processing shown in FIG. 26 may be the same as the respective kinds of processing in FIG. 23 described above. Referring to FIG. 27, when the BS 2 receives a DRC signal and a DSC signal for selecting the own apparatus from the AT (processing 8310), since the BS 2 has no means for learning to which extent the AT has successfully received data, the BS 2 transmits packets in a buffer of the BS 2 unconditionally (processing 2320). For example, data "26 and the subsequent data accumulated in processing 8250 and 8251 are transmitted to the AT. Since the AT has already received the data #26 to #36 from the BS 1 in processing 8240 and 8241, redundant data flow in a radio communication path. In this way, efficiency of use of the radio section may fall. A separation of redundant data and data not received is not always a separation of packets. Data #36 and #37 may be an identical packet.

On the other hand, according to this embodiment, since the BS2 transmits latest data among the accumulated data, it is less likely that redundant data is transmitted. When the latest data is transmitted, data received in the AT may be lost. However, it is possible to transmit the data without a loss by receiving a Nak message that requests the lost data from the AT and retransmitting the data. Moreover, a function of retransmitting lost data is given to the BS to make it possible to reduce time required for retransmission processing of the lost data.

The invention is applicable to, for example, industries related to packet communication systems and radio communication systems.

What is claimed is:

1. A radio communication method that uses a communication system which includes first and second communication connection apparatuses that communicate with a communication terminal by radio and a communication control apparatus that connects the first and the second communication connection apparatuses and a predetermined network and, in which communication data are transmitted from the first and second communication connection apparatuses in accordance with a DRC signal and a DSC signal, the communication method comprising:

a first data transmission step in which the first communication connection apparatus receives the DRC signal and the DSC signal both of which include an identifier of the first communication connection apparatus from the communication terminal and transmits communication data from the communication control apparatus to the communication terminal in accordance with the DRC signal;

a step in which the first communication connection apparatus, in a case of changing the DSC signal which is transmitted by the communication terminal, from the DSC signal including the identifier of the first communication connection apparatus to the DSC signal including an identifier of the second communication connection apparatus due to selection of the second communication connection apparatus by the communication terminal as a switching destination of a communication destination, transmits a sequence number of data following the communication data transmitted in the first data transmission step, received said DRC signal including the identifier of the first communication connection apparatus and received said DSC signal including the identifier of the second communication connection apparatus, to the communication control apparatus;

a step in which the communication control apparatus transmits communication data to the second communication connection apparatus in accordance with the DSC signal, where the communication data has sequence numbers which include the sequence number received from the first communication connection apparatus and indicate the sequence number of data following the communication data transmitted in the first data transmission step and subsequent sequence numbers among the communication data which have been transmitted to the first communication connection apparatus;

a step in which the communication control apparatus transmits communication data subsequent to data which have been transmitted to the first communication connection apparatus, to the first and second communication connection apparatuses;

a second data transmission step in which the first communication connection apparatus transmits communication data from the communication control apparatus to the communication terminal in accordance with the DRC signal;

an accumulating step in which the second communication connection apparatus accumulates the communication data of the sequence number and the subsequent sequence numbers from the communication control apparatus;

a third data transmission step in which the second communication connection apparatus, in a case of changing the DRC signal which is transmitted by the communication terminal, from the DRC signal including the identifier of the first communication connection apparatus to the DRC signal including the identifier of the second communication connection apparatus, receives the DRC signal and the DSC signal including the identifier of the second communication connection apparatus from the communication terminal and transmits latest data or predetermined numbered data from the latest data among the communication data accumulated in the accumulating step to the communication terminal for inclucing a retransmission request message;

a step in which the second communication connection apparatus receives, from the communication terminal, the retransmission request message for requesting lost data between the communication data received by the communication terminal in the first and the second data transmission step and the data received in the third data transmission step, the retransmission request message including a leading sequence number of the lost data; and a fourth data transmission step in which the second communication connection apparatus reads out communication data of the leading sequence number included in the received retransmission request message and subsequent sequence numbers among the communication data accumulated in the accumulating step and transmits the communication data to the communication terminal.

2. The radio communication method according to claim 1, wherein the retransmission request message further includes a data length of lost data specified by a sequence number of last communication data received from the first communication connection apparatus in the first and the second data transmission step and a sequence number of the data received in the third data transmission step.

3. The radio communication method according to claim 1, wherein the identifiers of the first and the second communication connection apparatuses are represented by DRC cover values or DSC cover values.

4. The radio communication method according to claim 1, further comprising:

a step in which the second communication connection apparatus judges whether communication data of the leading sequence number included in the retransmission request message and communication data of the subsequent sequence numbers, are accumulated;

a step in which the second communication connection apparatus adds a processing flag indicating that retransmission processing has been performed or not to the received retransmission request message, and, when it is judged that the communication data of the leading sequence number included in the retransmission request message and communication data of the subsequent sequence numbers are accumulated, the second communication connection apparatus executes the fourth data transmission step, sets the processing flag of the retransmission request message and transmits the retransmission request message to the communication control apparatus, and, when it is not judged that the communication data are accumulated, the second communication connection apparatus transmits the received retransmission request message to the communication control apparatus without setting the processing flag in the retransmission request message; and a step in which the communication control apparatus receives the retransmission request message and, in accordance with the processing flag added to the retransmission request message, when the processing flag is set, does not execute the retransmission processing, and when the processing flag is not set, transmits the communication data of the leading sequence number included in the retransmission request message and the communication data of the subsequent sequence numbers to the communication terminal via the second communication connection apparatus.

5. A radio communication system comprising:

a first communication connection apparatus that communicates with a communication terminal by radio;

a second communication connection apparatus that communicates with the communication terminal by radio due to handoff of the communication terminal, which communicates with the first communication connection apparatus; and a communication control apparatus that connects the first and the second communication connection apparatuses and a predetermined network, wherein communication data are transmitted from the first and second communication connection apparatuses in accordance with a DRC signal and a DSC signal, and wherein the first communication connection apparatus receives the DRC signal and the DSC signal both of which include an identifier of the first communication connection apparatus from the communication terminal and transmits communication data from the communication control apparatus to the communication terminal in accordance with the DRC signal;

the first communication connection apparatus, in a case of changing the DSC signal which is transmitted by the communication terminal, from the DSC signal including the identifier of the first communication connection apparatus to the DSC signal including an identifier of the second communication connection apparatus due to selection of the second communication connection apparatus by the communication terminal as a switching destination of a communication destination, and transmits a sequence number of data following the communication data transmitted to the communication terminal, received said DRC signal including the identifier of the first communication connection apparatus and received said DSC signal including the identifier of the second communication connection apparatus to the communication control apparatus;

the communication control apparatus transmits communication data to the second communication connection apparatus in accordance with the DSC signal, the communication data has sequence numbers which include the sequence number received from the first communication connection apparatus and indicate the sequence number of data following the communication data transmitted by the first communication connection apparatus and subsequent sequence numbers among the communication data which have been transmitted to the first communication connection apparatus;

the communication control apparatus transmits communication data subsequent to data which have been transmitted to the first communication connection apparatus, to the first and second communication connection apparatuses, the first communication connection apparatus transmits the communication data from the communication control apparatus to the communication terminal in accordance with the DRC signal;

the second communication connection apparatus accumulates the communication data of the sequence number and the subsequent sequence numbers, from the communication control apparatus;

the second communication connection apparatus, in a case of changing the DRC signal which is transmitted by the communication terminal, from the DRC signal including the identifier of the first communication connection apparatus to the DRC signal including the identifier of the second communication connection apparatus, receives the DRC signal and the DSC signal including the identifier of the second communication connection apparatus from the communication terminal and transmits, to the communication terminal for inducing a retransmission request message, latest data or predetermined numbered data from the latest data among the communication data accumulated;

the second communication connection apparatus receives, from the communication terminal, the retransmission request message for requesting lost data between the communication data received by the communication terminal from the first communication connection apparatus and the latest data or the predetermined numbered data from the latest data, the retransmission request message including a leading sequence number of the lost data; and the second communication connection apparatus reads out communication data of the leading sequence number included in the received retransmission request message and subsequent sequence numbers among the communication data accumulated, and transmits the communication data to the communication terminal.

6. The radio communication system according to claim 5, wherein the first and the second communication connection apparatuses include:

a data receiving section that receives data from the communication terminal;

a signal judging section that extracts the DRC signal and the DSC signal from the data received by the data receiving section, and judges whether an identifier of an owned communication connection apparatus which is one of the first and second communication connection apparatus is included in the DRC signal and the DSC signal;

a data accumulating section that accumulates communication data received from the communication control apparatus;

a data transmission judging section that extracts data from the data accumulating section, and outputs the data on the basis of a result of the judgment of the signal judging section;

a retransmission request message analyzing section that extracts the retransmission request message for a retransmission request from the data received by the data receiving section, and outputs a leading sequence number included in the retransmission request message;

a data retransmitting section that extracts communication data of the leading sequence number and communication data of subsequence sequence numbers from the data accumulating section and outputs the communication data on the basis of the leading sequence number from the retransmission request message analyzing section; and a data transmitting section that transmits the data from the data transmission judging section and the data retransmission section to the communication terminal.

7. The radio communication system according to claim 6, wherein the communication control apparatus includes:

a data receiving section that receives data from the first and the second communication connection apparatuses;

a signal judging section that extracts the DRC signal and the DSC signal from the data received by the data receiving section, and judges a transmission destination of communication data in accordance with the DRC signal and the DSC signal;

a data accumulating section that accumulates communication data received from the network;

a data transmission judging section that extracts data from the data accumulating section on the basis of a result of the judgment of the signal judging section, and outputs the data in accordance with the transmission destination judged by the signal judging section; and a data transmitting section that transmits the data from the data transmission judging section to the first and the second communication connection apparatuses.

8. The radio communication system according to claim 7, wherein the data retransmitting section of the first and the second communication connection apparatuses judges whether the communication data of the leading sequence number included in the retransmission request message and the communication data of the subsequent sequence numbers are accumulated, and adds a processing flag indicating that retransmission processing has been performed or not to the received retransmission request message, and, when it is judged that the communication data of the leading sequence number included in the retransmission request message and communication data of the subsequent sequence numbers are accumulated, sets the processing flag of the retransmission request message and transmits the retransmission request message to the communication control apparatus, and, when it is not judged that the communication data are accumulated, transmits the retransmission request message received to the communication control apparatus without setting the processing flag in the retransmission request message, and the communication control apparatus further includes:

a retransmission request message analyzing section that extracts the retransmission request message for a retransmission request from the data received by the data receiving section and, in accordance with the processing flag added to the retransmission request message, when the processing flag is not set, outputs the leading sequence number included in the retransmission request message; and a data retransmission processing section that extracts the communication data of the leading sequence number and the subsequent sequence numbers from the data accumulating section on the basis of the leading sequence number from the retransmission request message analyzing section, and transmits the communication data to the communication terminal via the second communication connection apparatus.

* * * * *